United States Patent [19]
Okino

[11] Patent Number: 5,221,965
[45] Date of Patent: Jun. 22, 1993

[54] IMAGE PROCESSING APPARATUS HAVING A SWITCH WITH DIFFERENT FUNCTIONS IN DIFFERENT MODES

[75] Inventor: Tadashi Okino, Yokohama, Japan

[73] Assignee: Canon Kabushiki Kaisha, Tokyo, Japan

[21] Appl. No.: 711,704

[22] Filed: Jun. 7, 1991

Related U.S. Application Data

[60] Continuation of Ser. No. 381,301, May 8, 1991, abandoned, which is a division of Ser. No. 51,322, May 19, 1987, abandoned.

[30] Foreign Application Priority Data

| May 21, 1986 | [JP] | Japan | 61-114906 |
| May 21, 1986 | [JP] | Japan | 61-114909 |
| May 21, 1986 | [JP] | Japan | 61-114910 |
| May 21, 1986 | [JP] | Japan | 61-114913 |
| May 21, 1986 | [JP] | Japan | 61-116372 |

[51] Int. Cl.$^5$ .................. H04N 5/76; G11B 15/04
[52] U.S. Cl. .................. 358/335; 358/906; 358/909; 360/62
[58] Field of Search .................. 358/335, 906, 909; 360/62

[56] References Cited

U.S. PATENT DOCUMENTS

| 4,420,773 | 12/1983 | Toyoda et al. | 358/335 |
| 4,456,931 | 6/1984 | Toyoda et al. | 358/335 |
| 4,495,527 | 1/1985 | Kozuki et al. | 358/335 X |
| 4,593,985 | 6/1986 | Minakuchi | 358/335 X |
| 4,604,668 | 8/1986 | Lemelson | 358/906 |
| 4,658,304 | 4/1987 | Tsunekawa et al. | 358/906 X |
| 4,739,417 | 4/1988 | Ogawa | 358/906 X |
| 4,742,369 | 5/1988 | Ishii et al. | 358/906 X |

*Primary Examiner*—W. B. Perkey
*Attorney, Agent, or Firm*—Fitzpatrick, Cella, Harper & Scinto

[57] ABSTRACT

An apparatus having an UP and DOWN switches which enable the user to set photographing conditions or parameters of the photographing condition, and which has a reproducing function by itself or by connection to an external device through an adapter. The UP and DOWN switches also enable the user to effect the frame or track feed for allowing a head to make an access to a desired track during reproduction.

15 Claims, 16 Drawing Sheets

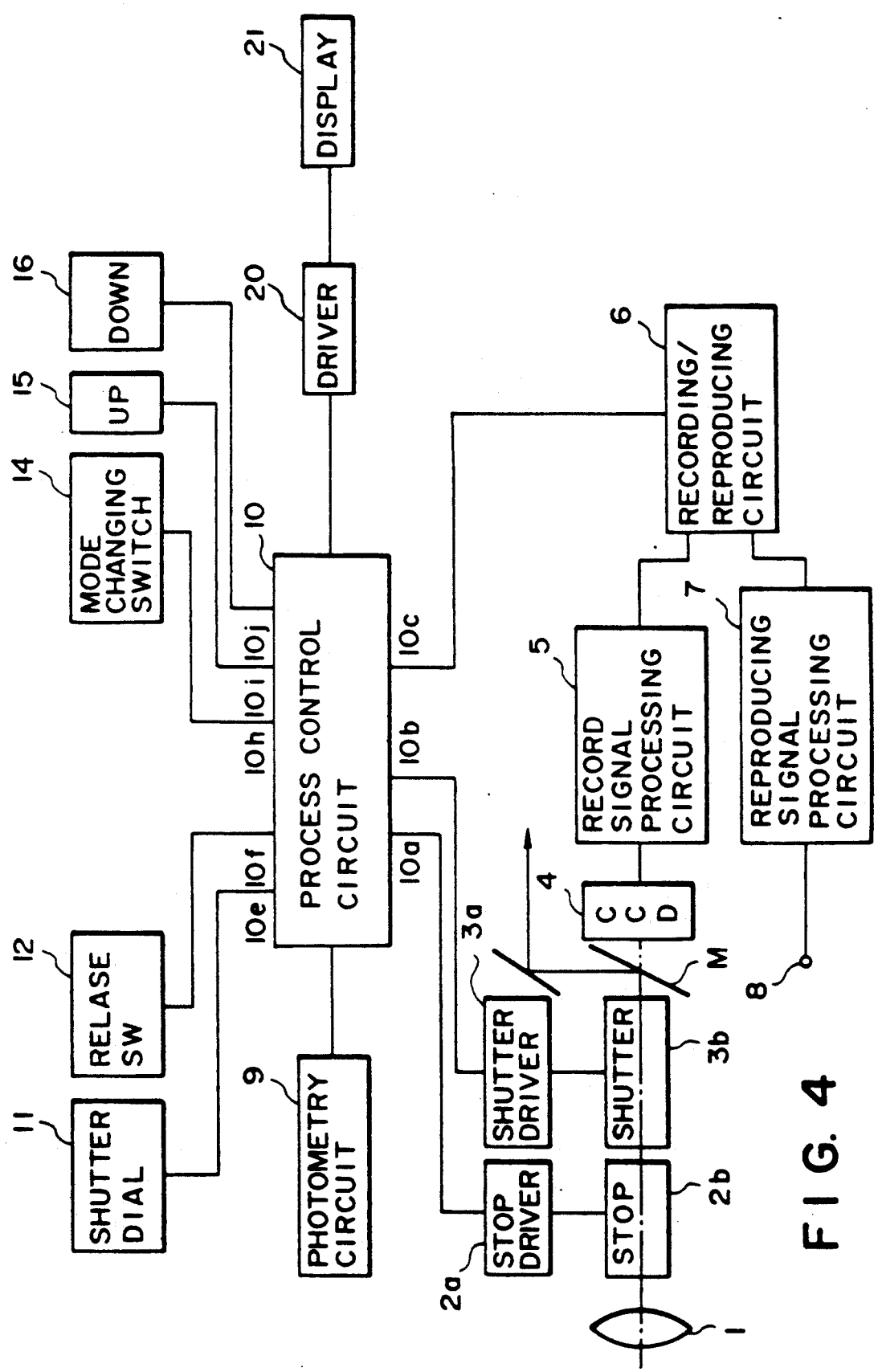
F I G. 4

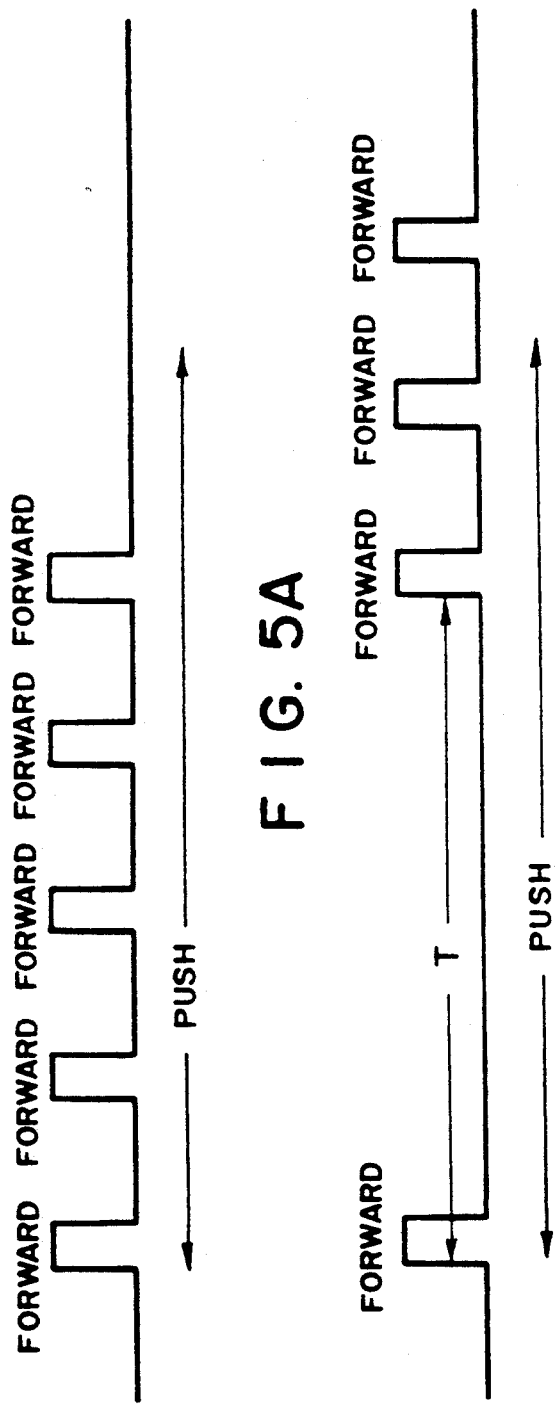

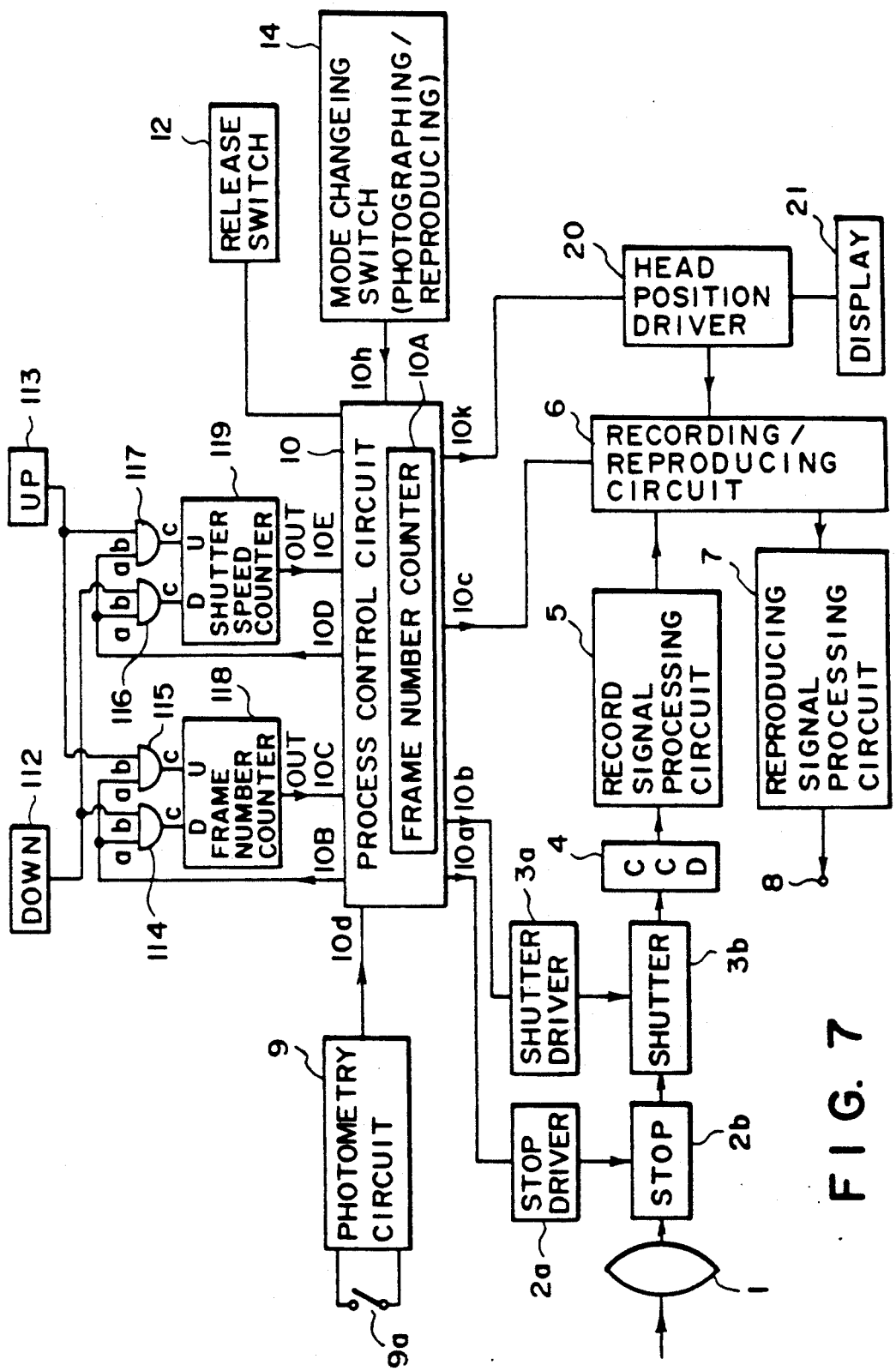
F I G. 7

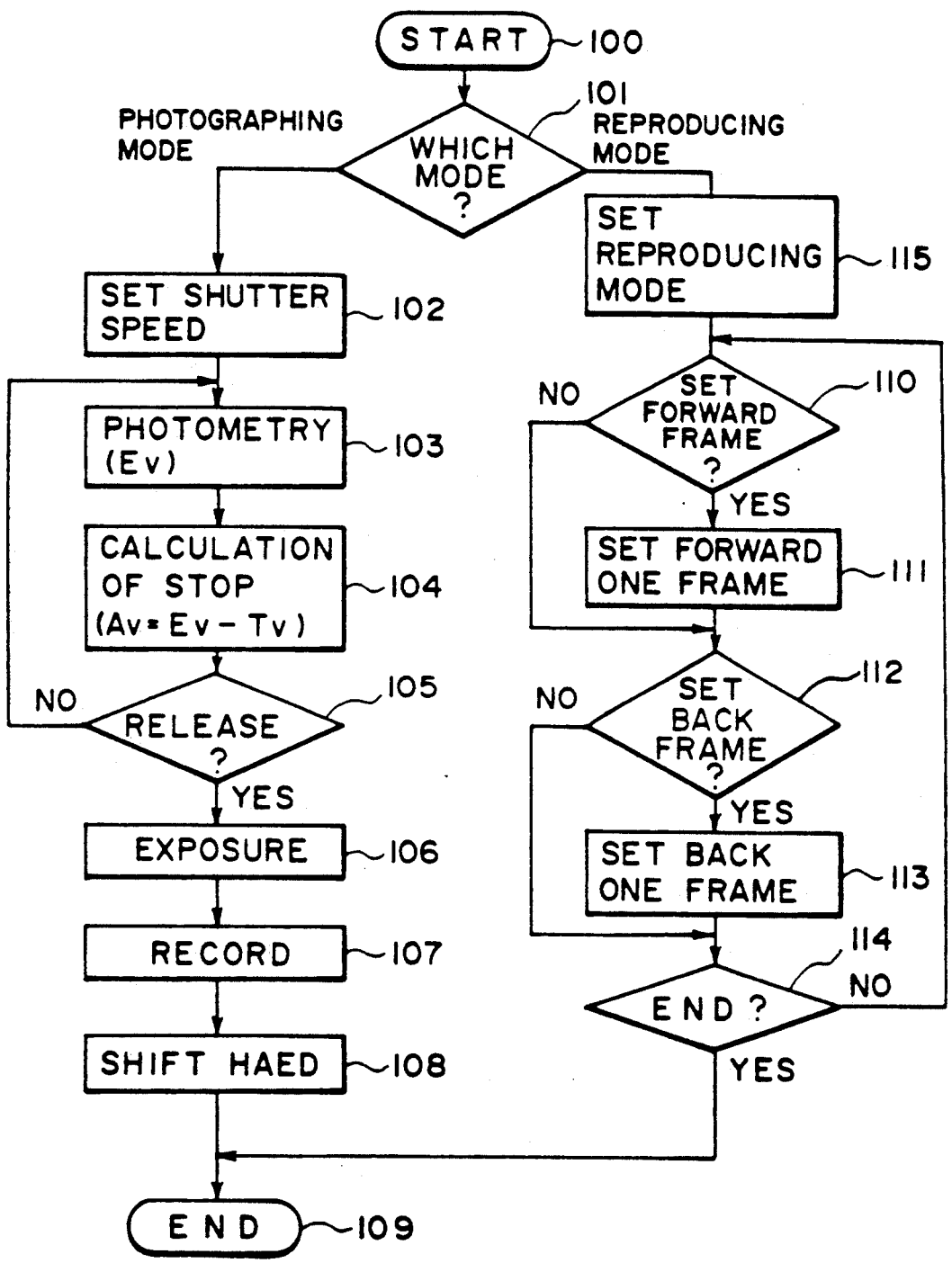
F I G. 8

| SHUTTER SPEED | OUTPUT OF COUNTER 19 |
|---|---|
| 1/1000 | 10 |
| 1/500 | 9 |
| 1/250 | 8 |
| 1/125 | 7 |
| 1/60 | 6 |
| 1/30 | 5 |
| 1/16 | 4 |
| 1/8 | 3 |
| 1/4 | 2 |
| 1/2 | 1 |
| 1 | 0 |
F I G. 9
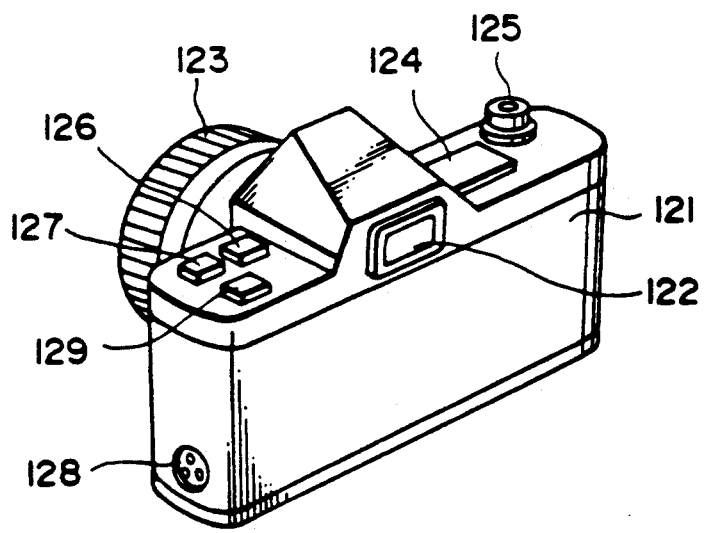
F I G. 10

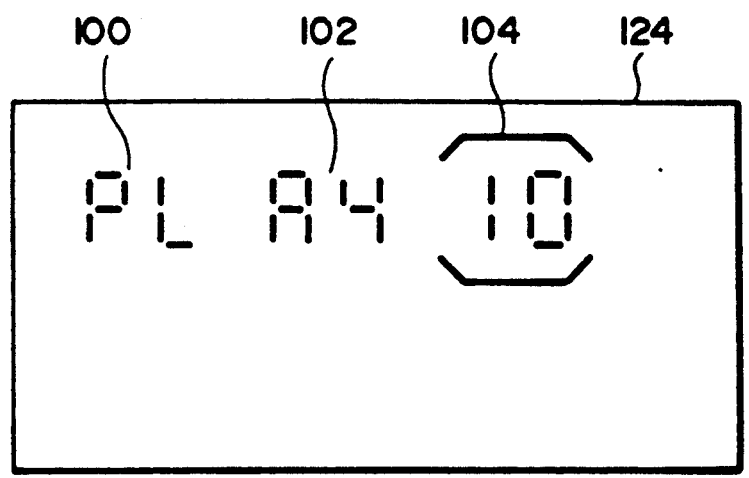
F I G. 14

IMAGE PROCESSING APPARATUS HAVING A SWITCH WITH DIFFERENT FUNCTIONS IN DIFFERENT MODES

This application is a continuation of application Ser. No. 07/381,301 filed May 8, 1991, now abandoned, which is a division of application Ser. No. 07/051,322 filed May 19, 1987, now abandoned.

BACKGROUND OF THE INVENTION

1. Field of the Invention

The present invention relates to a image processing apparatus and, more particularly, to a image processing apparatus capable of recording and reproducing a picture in the form of electric signals.

2. Related Background Art

Hitherto, various image processing apparatus have been known which are capable of recording a image in a medium and reproducing the image from the medium. These apparatus usually have display means for displaying data input to the apparatus. In general, there is a tendency that the size of the display means becomes large as the number of functions employed by the apparatus is increased, which in turn gives a rise to the demand for a reduction in the size of the display means. To cope with such a demand, the present applicant has proposed a display system in which the same display device is used for displaying both the track during photographing operation and the track during the reproduction, as in the specification of the U.S. Pat. No. 4,366,501. The greater number of data input to the display device, however, requires a greater number of input control means such as a switch for inputting photographing data, a switch for giving a reproduction instruction, and so forth.

More specifically, a photographing operation for picking up an image of an object usually requires determination of many photographing or exposure factors such as AE mode, shutter speed, stop value, white balance, exposure correction and so forth. If independent operation members are provided for the respective factors, the apparatus will have an impractically large number of operation members, which in turn will encounter a difficulty in finding suitable spaces for installing such operation members. This is quite inconvenient from the view point of compact design of the apparatus. In addition, provision of many operation members will undesirably impair the appearance of the apparatus.

In order to overcome this problem, it has recently been proposed to use an operation system which has a selector switch which enables the user to select the condition or factor to be operated, and an up/down switch which enables the user to determine the value or state of the selected factor.

Image processing apparatus, when provided with reproducing function, essentially require means for allowing the recording medium to be fed back and forth as desired. Such an operation means also requires an independent operation member which occupies a considerable portion of the space on the external surface of the apparatus. In addition, the production cost is raised and the operation is complicated.

Known image processing apparatus of the kind described also employ displaying means which indicates, within a finder, various data for enabling the user to confirm the brightness of the object and other photographing conditions while aiming at the object through the finder. In some cases, such an image processing apparatus has the reproducing function in itself or externally so as to be connected thereto through an adapter. The displaying means in the finder can indicate only those data which are necessary for photographing. Such data are usually unnecessary during reproduction. In addition, reproduction of the recorded image usually takes longer time than the photographing operation. In consequence, during the reproduction of the recorded image, unnecessary data are indicated by the display device for a long time, resulting in a wasteful use of the battery power and, hence, a shorter life of the battery. The life of the display device itself also is reduced as a result of continuous operation.

Some image processing apparatus of the type described have a function for allowing an operation generally referred to as "track feed". This operation requires a definite time, so that the arrangement is usually made such that the feed is effected only by one track each time a track feed switch is pressed. Thus, when the user wishes to effect a feed by an amount corresponding to three tracks, he presses the switch for the second time and confirms that the track feed has been completed by an amount corresponding to one track, and then presses the same switch for the second time and confirms the next feed by an amount corresponding to one track, and finally presses the same switch for the third time followed by confirmation of the state of having completed the track feed operation to the desired track. The greater the track number, the more times the user is required to operate the switch, which is quite troublesome and time consuming.

SUMMARY OF THE INVENTION

Accordingly, it is a primary object of the present invention to provide an improved image processing apparatus which is capable of eliminating all these problems of the prior art.

More specifically, an object of the present invention is to provide a image processing apparatus which is improved to enable numerous data to be input through a minimized number of input means, and particularly an apparatus which enables photographing and reproducing data through minimal input means.

To this end, according to a preferred form of the present invention, there is provided a image processing apparatus of the type having means for picking up the image of an object, means for recording data of the pick-up image in a recording medium, and means for reproducing the recorded picture data, wherein the improvement comprises first input means for inputting either one of a photographing mode and a reproducing mode, and an operation member which gives an instruction for starting photographing and recording when the photographing mode is being input through the first input means and an instruction for starting reproduction when the reproducing mode is being input through the first input means. When the photographing mode is being input by the first input means, the user can shoot the object and record the image of the object by manipulating the operation member, whereas, when the reproducing mode is being input by the first input means, the user can cause the apparatus to reproduce the recorded image by manipulating the operation member. It is thus possible to shoot, record and reproduce a image with a reduced number of input means.

According to another preferred form of the invention, there is provided a image processing apparatus having a reproducing function in itself or externally for connection thereto through an adapter, the apparatus having an up/down switch for determining the photographing condition or a parameter of the photographing condition, wherein the up/down switch for determining the photographing condition also serves as means for giving instruction for effecting the track feed, during reproduction.

Another object of the present invention is to provide a image processing apparatus which is improved in such a way as to reduce the power consumption during reproduction.

To this end, in another aspect of the present invention, there is provided an image processing apparatus having both a photographing function and recording function, wherein the display of data within the view finder is suspended during reproduction of the image, thereby eliminating the unnecessary display of data, thus preventing deterioration of the displaying elements, while enabling batteries to operate for a longer time.

Still another object of the present invention is to provide a image processing apparatus having a signal input means which is capable of promptly and securely inputting by means of an up/down signal input member.

It is also an object of the invention to provide a image processing apparatus having a signal input means which enables the access positions of recording and reproducing means with respect to the recording medium to be changed quickly and securely through the operation of an up/down signal input means.

To these ends, according to still another aspect of the present invention, there is provided an image processing apparatus having means for storing the number of pressing strokes of an up/down switch, and means for effecting track feed by an amount corresponding to the stored number of strokes of the up/down switch.

These and other objects, features and advantages of the present invention will become clear from the following description of the preferred embodiments when the same is read in conjunction with the accompanying drawings.

BRIEF DESCRIPTION OF THE DRAWINGS

FIG. 4 is a block diagram of a second embodiment of the present invention;

FIGS. 5A and 5B are timing charts showing the timing of operations for forwarding a recording medium during the reproducing operation of the second embodiment;

FIG. 7 is an electric circuit diagram of a third embodiment of the present invention;

FIG. 8 is a chart showing the relationship between the output from a shutter speed setting counter 119 employed in the circuit shown in FIG. 7 and the actual shutter speed;

FIG. 9 is a flow chart showing an example of the flow of control performed in the third embodiment;

FIG. 10 is a schematic perspective view of a picture pickup apparatus as a fourth embodiment of the present invention;

FIG. 14 is an illustration of an example of the content indicated by an external display device;

DESCRIPTION OF THE PREFERRED EMBODIMENTS

Figure 1:
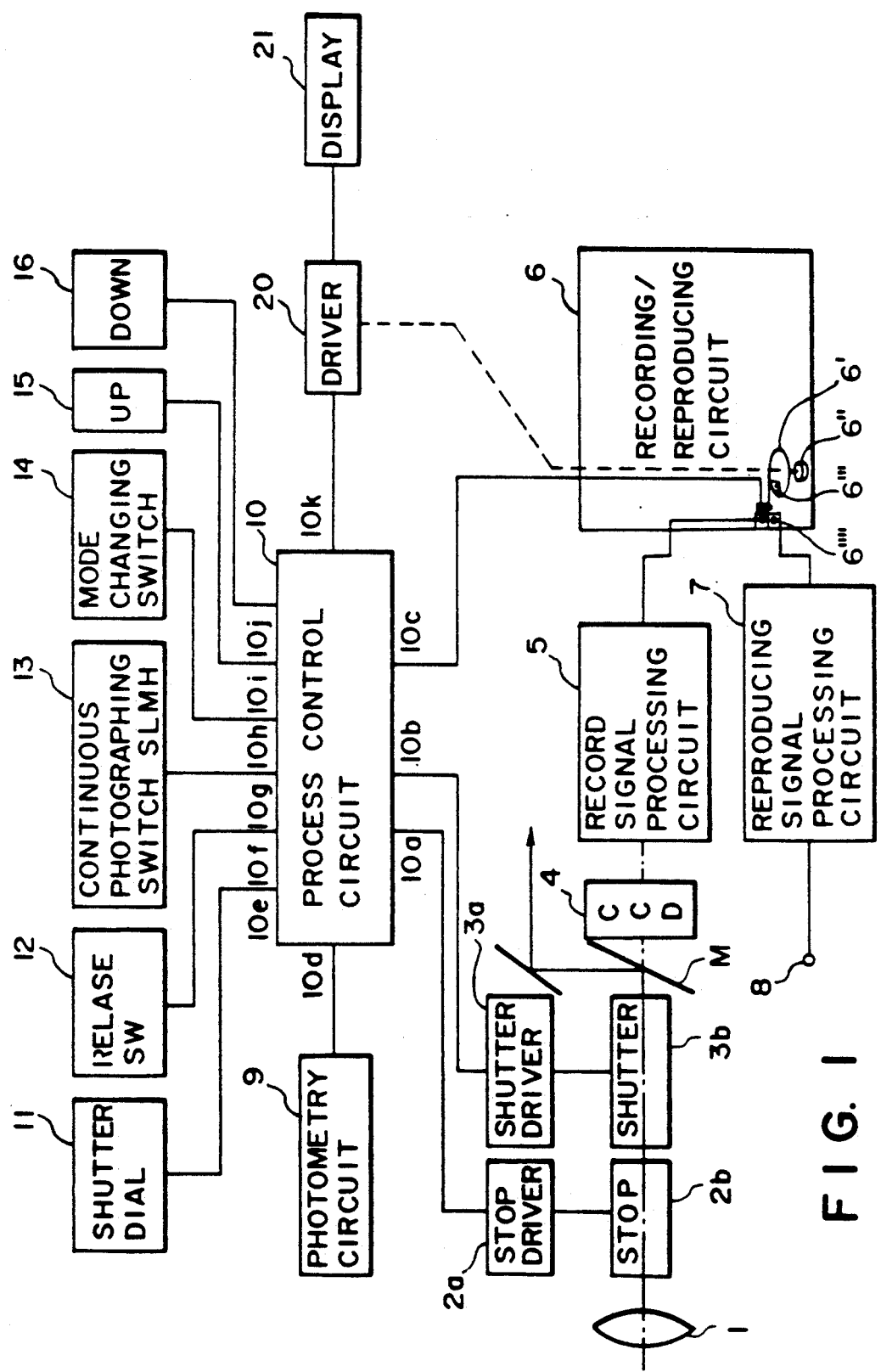
FIG. 1 is a block diagram of a first embodiment of the present invention.

FIG. 1 is a block diagram showing the construction of a first embodiment of the image processing apparatus in accordance with the present invention. The apparatus has an optical system 1 for focusing the image of an object, a stop driver 2a, a stop 2b, a shutter driver 3a and a shutter 3b. The apparatus also has a image pickup device 4 such as a CCD for converting the object image into electric signals, a record signal processing circuit 5 for converting the signals from the image pickup device 4 into record picture signal, a recording/reproducing circuit for recording or reproducing the signal in and from a recording medium 6', and a reproduction signal processing circuit 7 for reproducing an image signal from the recording medium 6'. The reproduction signal processing circuit has output terminals 8. Numerals 6" and 6''', respectively, denote a disk rotation motor for rotating the medium 6' and a recording/reproduction head. A switch for changing-over the operation between recording mode and reproducing mode is designated by a numeral 6''''.

The apparatus further has a process control circuit 10 for controlling the operation of the whole apparatus, a shutter dial 11 for setting the shutter speed, and a release switch 12 for giving a photographing instruction. The release switch 12 includes two switches SW1 and SW2 which are adapted to operate at different pressing strokes. Namely, when the pressing stroke is short, only the switch SW1 is turned on, whereas, when the pressing stroke is long, both the switches SW1 and SW2 are turned on. The switch SW1 is a switch for giving an instruction for photometry, while the switch SW2 is a switch for giving an instruction for recording the picked up image.

A reference numeral 13 designates a switch which is adapted for allowing the user to change-over the speed of feed of the medium between the single shot and the continuous shot. This switch will be referred to as continuous photographing switch. A reference numeral 14 denotes a mode changing switch for allowing the user to switch the operation mode between the photographing (recording) mode and the reproducing mode. Numerals 15 and 16 denote, respectively, UP and DOWN switches for effect the feeding forward and backward, respectively, during operation of the apparatus in the reproducing mode.

The operation of this embodiment will be explained hereinunder with reference to the drawings.

For the purpose of photographing and recording the image of an object, the user operates the mode changing switch 14 to the photographing mode so that a photographing mode signal is input to a terminal 10h of the process control circuit 10, thus setting the apparatus in the photographing mode. As the photometry start switch is turned on, the photometry circuit 9 operates to deliver its output Ev to a terminal 10d of the process control circuit 10. The process control circuit 10 also receives a shutter speed data (Tv value) from the shutter dial 11 through a terminal 10e. Upon receipt of both the signals Ev and Tv, the process control circuit 10 conducts 40 computations so as to determine the aperture value (Av value) to be obtained, in accordance with the formula (1).

$$Av = Ev - Tv \qquad (1)$$

Then, as the release switch 12 is pressed, a signal for giving a photographing instruction is delivered to a terminal 10f of the process control circuit 10 so that the latter delivers, through its terminals 10a and 10b, drive signals to the stop driver 2a and the shutter driver 3b thereby driving the stop 2b and the shutter 3b. As a result, the image pickup device 4 is exposed so as to produce a photoelectric picture signal which is delivered to the record signal processing circuit 5 which is adapted to convert the photoelectric signal into the record signal. The thus obtained record signal is recorded in the recording medium 6' by the operation of the recording/reproducing circuit 6.

When the continuous photographing switch 13 is set for a single photographing mode S, the medium is fed only by one frame, even though the release switch 12 is kept in the pressed state. In addition to the single photographing mode S, the continuous photographing switch S can select three different continuous photographing modes L (Low), M (Medium) and H (High) of different speeds. The arrangement is such that the apparatus repeats the exposure and recording at the selected speed as long as the release switch 12 is in the pressed position.

The reproduction of the recorded signal is conducted in a manner which will be explained hereinunder. As the mode changing switch 14 is turned for the reproduction mode, the reproduction signal is delivered to the terminal 10h of the process control circuit 10. At the same time, the recording/reproducing circuit 6 reads image signals from the recording medium 6' in accordance with the output signal from the terminal 10c of the process control circuit 10, and delivers the read signal to the reproduction signal processing circuit 7. The circuit 7 converts the image signals into signals of a form suitable for reproduction, e.g., NTSC, and delivers the converted signals through its terminal 8.

When the continuous photographing switch 13 selects the single photographing mode S, the medium is fed forward and backward by a distance corresponding to one frame, in response to each stroking of the UP switch 15 and the DOWN switch 16, respectively. Namely, the arrangement is made such that the medium is fed only once by an amount corresponding to one frame, even through the UP or DOWN switch is kept in the pressed position. However, if the continuous photographing switch 13 selects one of the continuous photographing modes L (Low), M (Medium) and H (High), the head is moved forward or backward at the selected speed according to the selection of L, M, or H if the UP switch 15 or the DOWN switch 16 is kept in the pressed position. The movement of the head is stopped as the switch 15 or 16 is returned, and the reproduction is completed as the release switch 12 is pressed.

Figure 2A:
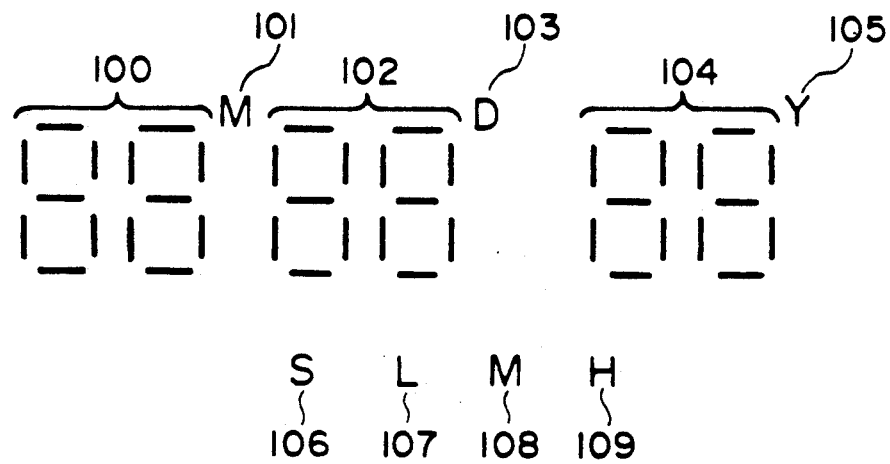
FIGS. 2A, 2B and 2C are illustrations of examples of the display employed in the first embodiment.

An explanation will be made hereinunder as to the display of the input data. FIG. 2A shows an example of the display of input data on the display device 21 in the first embodiment. The display device 21 employs three display units 100, 102 and 104 each having two digits each consisting of seven segments of elements such as liquid crystal elements. These units 100, 102 and 104 are adapted for displaying variable data such as month, day and year. Marks M, D and Y, representing month, day and year, respectively, are given in regions 101, 103 and 105. Numerals 106, 107, 108 and 109 are regions for displaying the continuous photographing mode selected by the continuous photographing switch 13, mode, i.e., one of the modes S, L, M and H.

Figure 2B:
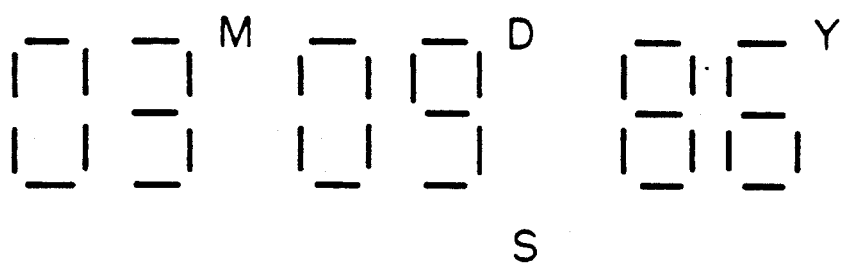

FIG. 2B shows an example of the content of the display. This display reads as Mar. 5, 1986 and shows that the single photographing mode S has been selected.

Figure 2C:
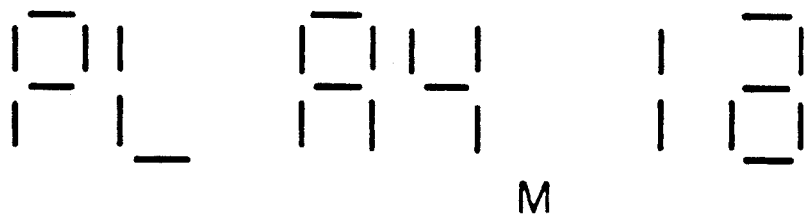

FIG. 2C shows an example of the display which is made when the apparatus is in the reproducing mode. The display reads as "PLAY" which represents that the apparatus is in the reproducing mode. A numeral appearing on the right side of the display "PLAY" shows the position of the frame which is being reproduced, while a mark M means that the UP or DOWN switch selects the continuous feed at the medium speed. Thus, the display device enables the user to confirm the input data and the reproduced data.

Figure 3:
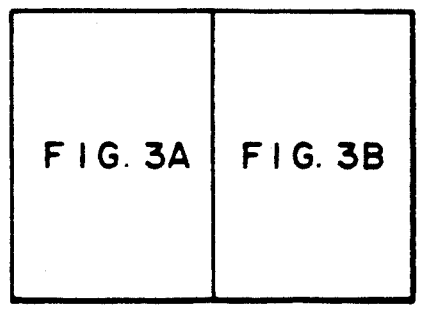
FIG. 3, consisting of FIGS. 3A and 3B, is a flow chart illustrating the flow of the control performed in the first embodiment.
Figure 3A:
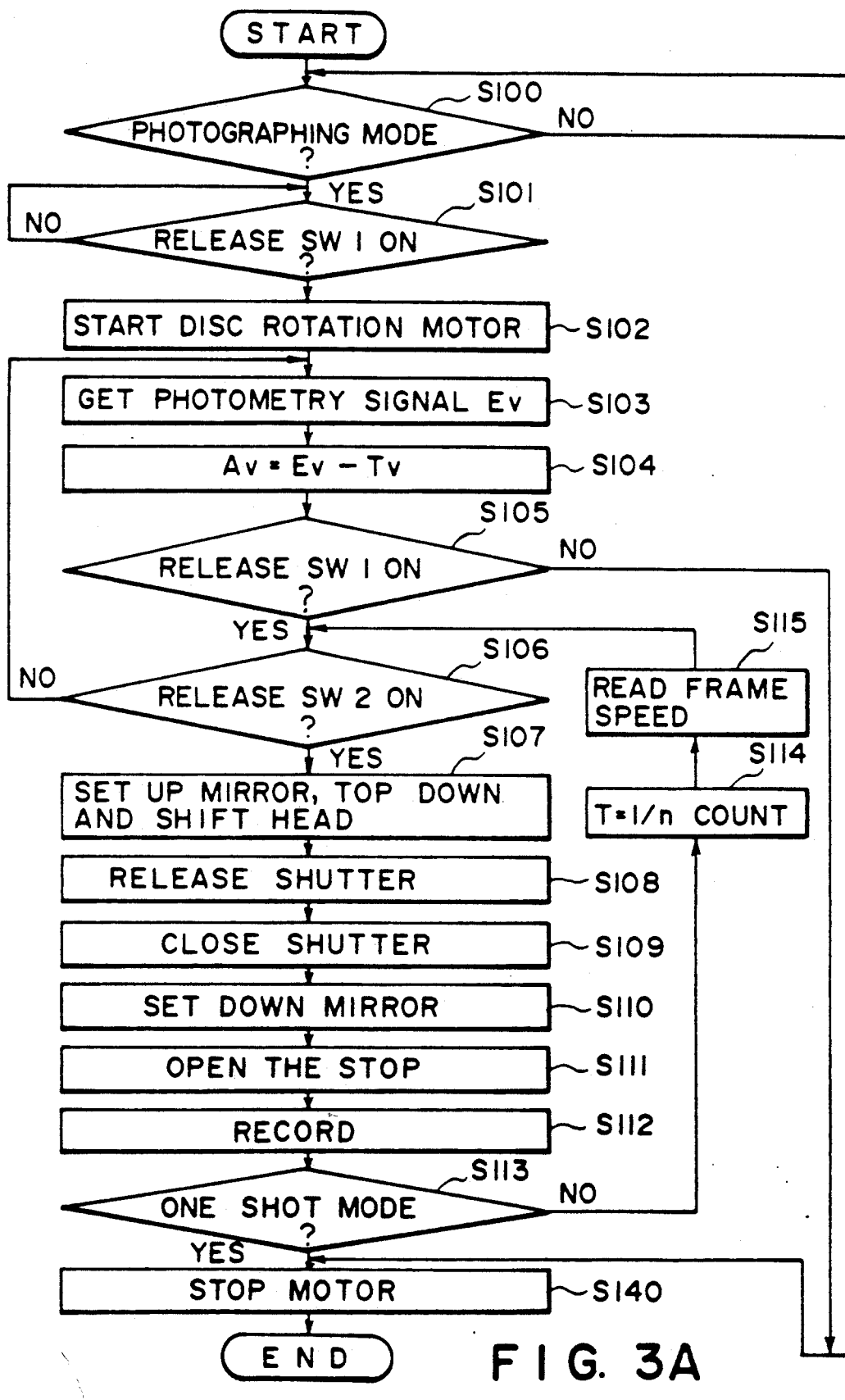
Figure 3B:
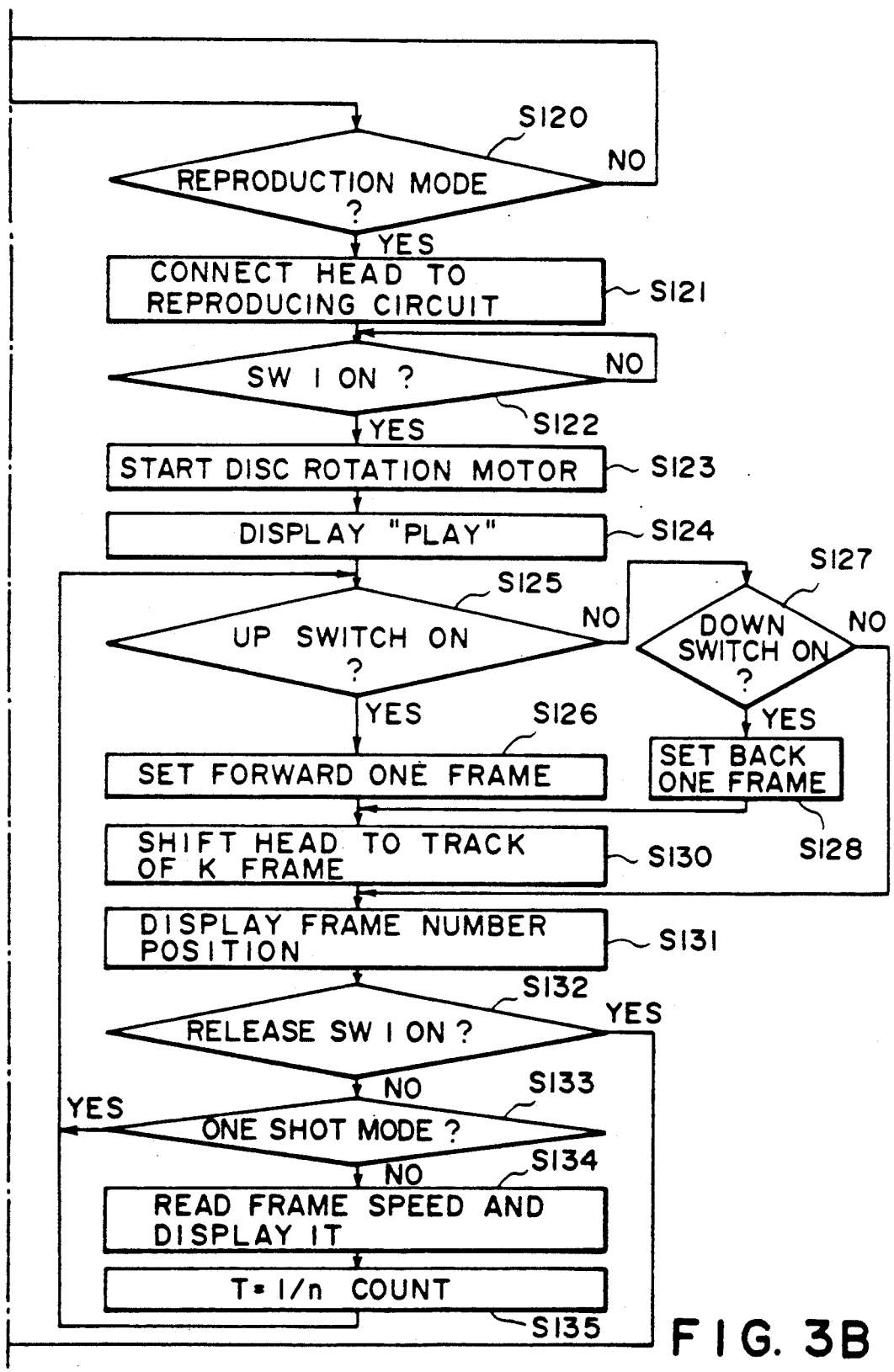

FIG. 3 shows the process of the control performed by the process control circuit 10 in the first embodiment. This process is programmed and stored in a read only memory (ROM) incorporated in the process control circuit 10.

Referring to FIG. 3, as the user operates the mode changing switch 14 to select the photographing mode, a judgement is made in Step S100 whether the input mode is the photographing mode or not. If the answer is NO, the process proceeds to Step S120 because the reproducing mode has been selected. If the answer is YES, i.e., if the photographing mode has been latched, a judgment is made in Step S101 as to whether the switch SW1 of the release switch 14 has been pressed or not. If the answer is NO, the process is suspended to wait for the operation of the switch SW1. Then, as the switch SW1 is pressed, the process control circuit 10 judges that a photographing instruction is given, so that the process proceeds to Step S102.

In Step S102, a disk rotation motor 6" is started for driving the recording medium in the recording circuit. In Step S103, the process control circuit 10 gives an instruction to the photometry circuit 9 for starting the photometry. In Step S104, the process control circuit 10 computes the stop value (Av value) in accordance with the result of the photometry and the shutter speed given through the shutter dial 11, and then waits for the photographing. Then, as the full pressing of the release switch, i.e., turning on of the switches SW1 and SW2, is confirmed in Steps S105 and S106, an operation is carried out in Step S107 for raising the finder mirror and for reducing the stop 2b, while moving the recording head 6''' in the recording circuit 6 to a desired track on the recording medium. In Step S105, if the switch SW1 has not been turned on, the process proceeds to Step S140 so as to stop the disk rotation motor 6". In Step S106, if the switch SW2 has not been turned on, the process returns to Step S103 to conduct the photometry once again.

In Step S108, an instruction is given to the shutter driver 3a so as to open the shutter 3b, thereby allowing the apparatus to conduct the photographing operation at the given shutter speed. In Step S109, the shutter driver 3a receives an instruction for closing the shutter 3b. Then, the finder mirror M is set down and the stop 2b is opened in Steps S110 and S111. In Step S112, the process control circuit 10 gives an instruction for allowing the recording/reproducing circuit 6 to record the image signals which have been delivered thereto through the exposure device 4 and the record signal processing circuit 5, and proceeds further to Step S113 in which a judgment is made as to whether the present mode is the single photographing mode or not.

If the answer is NO, the process control circuit 10 reads the set speed of the continuous photographing mode, and computes the interval of the continuous photographing in Steps S114 and S115, and then returns the process to Step S106 thereby to continue the continuous photographing operation. When the judgment in Step S113 has proved that the present mode is the single photographing mode, the process control circuit 10 operates to stop the disk rotation motor 6" in Step S140 so as to stop the photographing operation.

In Step S120, a judgment is conducted as to whether the present operation mode is the reproduction mode. If the answer is NO, the process returns to Step S100. Conversely, when the answer is YES, i.e., when the reproduction mode has been latched, the process proceeds to Step S121 so as to instruct the recording/reproducing circuit 6 to conduct the reproducing operation, so that the switch 6''' is turned to the signal processing circuit 7 thereby setting the recording head in the predetermined track position on the recording medium. Then, in Step S122, a judgment is conducted as to whether the reproduction is permitted by the switch SW1.

If the answer is NO, the process is suspended to wait for the input through the switch SW1. If the answer is YES, i.e., if the reproduction is permitted by the switch SW1, the disk rotation motor is started and the display "PLAY", as shown in FIG. 2C indicative of the reproduction, is made on the display device 21, in Steps S123 and S124. In Step S125, a judgment is made as to whether the UP switch 15 has been turned on. If this switch has been turned on, an operation is conducted to set forward one on the frame number K in Step S126 and the process proceeds to Step S130. However, if the UP switch has not been turned on, a judgment is made in Step S127 as to whether the DOWN switch 16 has been turned on or not.

If the DOWN switch 16 has been turned on, an operation is conducted to set back one from the frame number K in Step S128 and then the process proceeds to Step S130. If not, however, the process proceeds to Step S131. In Step S130, the recording head is shifted to the position of the track in the recording medium in which the image signals corresponding to the frame K are stored. In Step S131, the frame number K is displayed on the display device 21.

In the next step, Step S132, a judgment is made again as to whether the switch SW1 has been turned on. If the answer is NO, the process proceeds to Step S133 in which a judgment is made as to whether the present photographing mode is the single photographing mode or not. When the on state of the switch SW1 is confirmed in Step S131, the process proceeds to Step S140 in which the disk rotation motor 6" is stopped thereby completing the series of control processes. If the single photographing mode has been selected, the process returns to Step S125, whereas, if not, the frame speed read in Step S134 is read and the frame speed is displayed on the display device 21 in Step S134.

In the next step Step S135, a computation is conducted to determine the reproduction frame interval from the frame speed, and the process returns to Step S125.

Then, the described procedures are repeated so as to conduct recording and reproduction of the image in accordance with the photographing and reproducing instructions, respectively.

FIG. 4 shows the circuitry incorporated in a second embodiment of the present invention. This embodiment is materially the same as the first embodiment except that the continuous photographing switch 13 is omitted.

Thus, in the second embodiment, only the the single photographing mode is available, so that the frame is set forward or backward by one when the UP switch 15 or the DOWN switch 16 is pressed for a period shorter than a predetermined period. However, if the UP or DOWN switch 15 or 16 is pressed for a period longer than the predetermined period, the apparatus conducts a frame feed forward or backward at a constant speed. If this speed is low, the arrangement may be such that the feed is conducted at the constant speed after the pressing of the switch 15 or 16 is commenced, as shown in FIG. 5A. In contrast, when the feed speed is so high that there is a risk that the feed may be effected by an amount corresponding to two frames, the arrangement may be such that the feed by one frame is conducted immediately after the pressing of the switch 15 or 16 is commenced and then the next feed is effected only when the switch 15 or 16 is kept pressed for a period longer than a predetermined period.

Figure 6A:
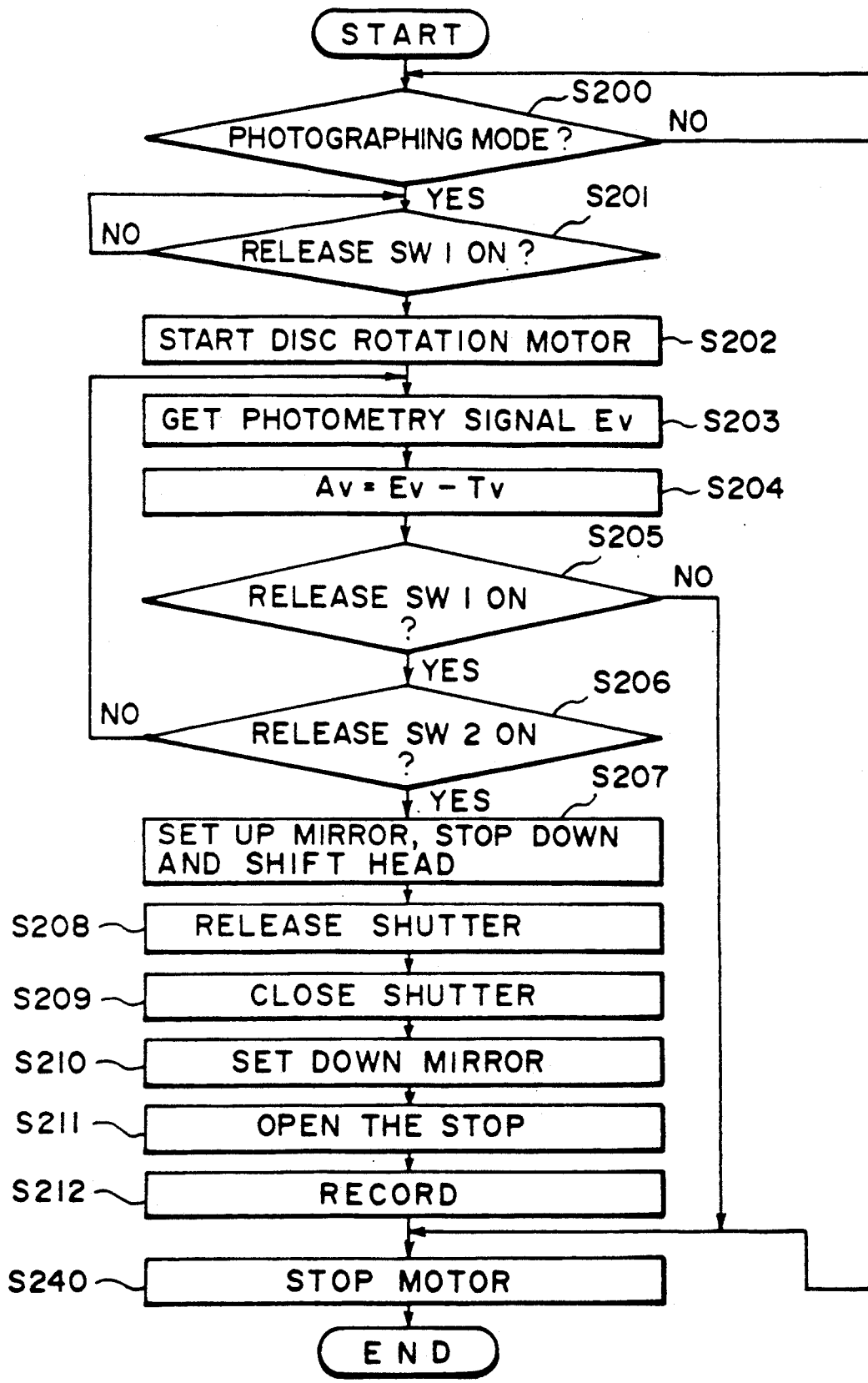
FIG. 6, consisting of FIGS. 6A and 6B, is a flow chart illustrating the flow of the control performed in the second embodiment.
Figure 6B:
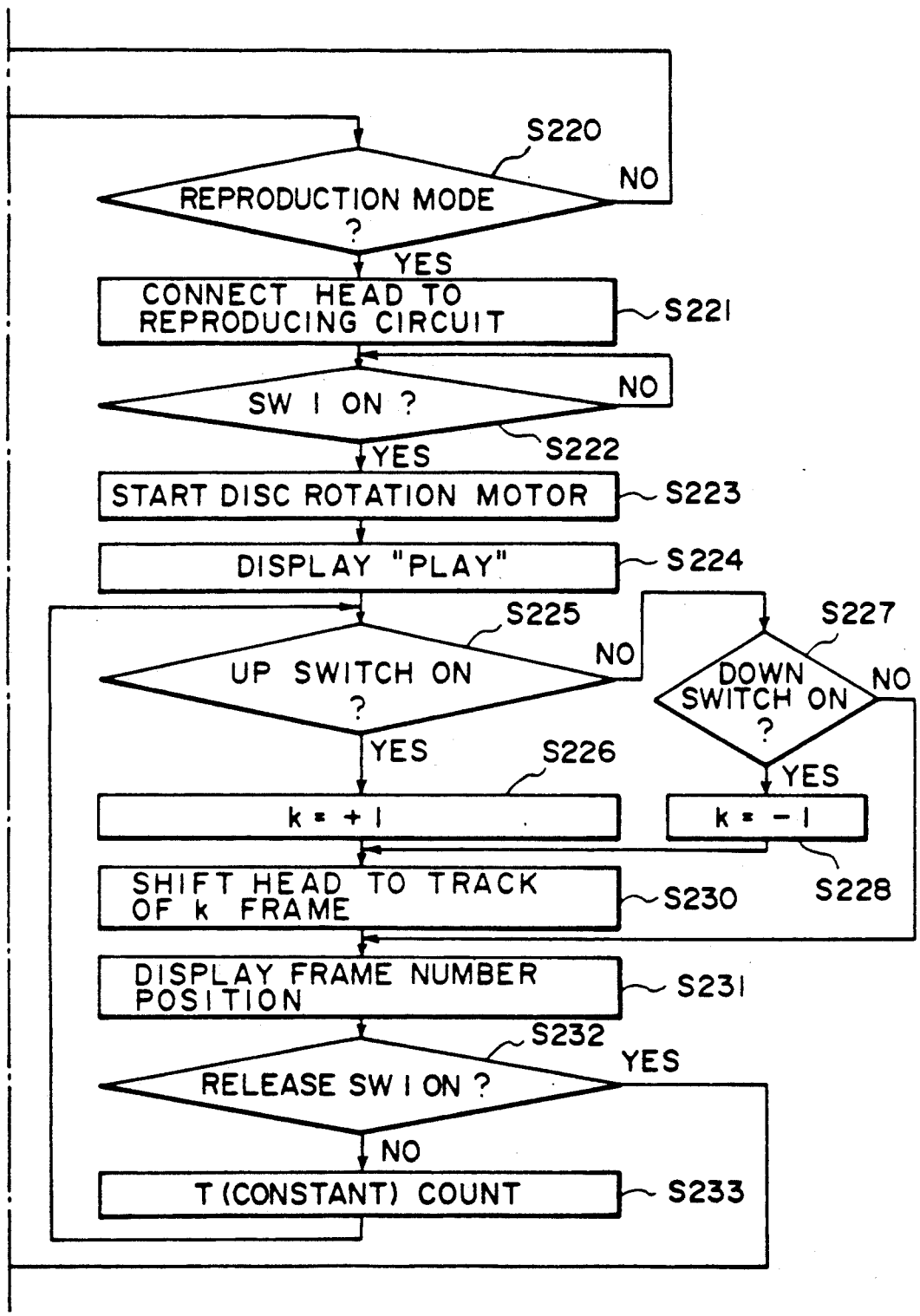

FIG. 6 shows an example of the process control performed by the process controller 10 incorporated in the second embodiment.

A judgment is made in Step S200 as to whether the input mode is the photographing mode or not. If the answer is NO, the process proceeds to Step S220 because the reproducing mode has been selected. If the answer is YES, i.e., if the photographing mode has been selected, a judgment is made in Step S201 as to whether the switch SW1 of the release switch 14 has been pressed or not. If the answer is NO, the process is suspended to wait for the operation of the switch SW1. If the switch SW1 has been pressed, the process control circuit 10 judges that a photographing instruction is given, so that the process proceeds to Step S202. In Step S202, a disk rotation motor 6" is started for driving the recording medium 6' in the recording circuit 6.

In Step S203, the process control circuit 10 gives an instruction to the photometry circuit 9 for starting the photometry. In Step S204, the process control circuit 10 computes the stop value (Av value) in accordance with the result of the photometry and the shutter speed given through the shutter dial 11, and then waits for the photographing. Then, as the full pressing of the release switch, i.e., turning on of the switches SW1 and SW2, is confirmed in Steps S205 and S206, an operation is conducted in Step S207 for raising the finder mirror and for reducing the stop 2b, while moving the recording head 6''' in the recording circuit 6 to the position of a desired track on the recording medium.

In Step S205, if the switch SW1 has not been turned on, the process proceeds to Step S240 so as to stop the disk rotation motor 6". In Step S206, if the switch SW2 has not been turned on, the process returns to Step S203 to conduct the photometry once again. In Step S208, an instruction is given to the shutter driver 3a so as to open the shutter 3b, thereby allowing the apparatus to conduct the photographing operation at the given shutter speed. In Step S209, the shutter driver 3a receives an instruction for closing the shutter 3b. Then, the finder mirror M is set down and the stop 2b is opened in Steps S210 and S211. In Step S212, the process control circuit 10 gives an instruction for allowing the recording/reproducing circuit 6 to record the image signals which have been delivered thereto through the exposure device 4 and the record signal processing circuit 5, and proceeds further to Step 240 in which the disk rotation motor is stopped to complete the photographing operation.

In Step S220, a judgment is made as to whether the present operation mode is the reproduction mode. If the answer is NO, the process returns to Step S200. Conversely, when the answer is YES, i.e., when the reproduction mode has been selected, the process proceeds to Step S221 so as to instruct the recording/reproducing circuit 6 to conduct the reproducing operation, thereby setting the recording head in the predetermined track position on the recording medium. Then, in Step S222, a judgment is made as to whether the reproduction is permitted by the switch SW1. If the answer is NO, the process is suspended to wait for the input through the switch SW1. If the answer is YES, i.e., if the reproduction is permitted by the switch SW1, the disk rotation motor is started and the display "PLAY" indicative of the reproduction is displayed on the display device 21, in Steps S223 and S224.

In Step S225, a judgment is made as to whether the UP switch 15 has been turned on. If this switch has been turned on, an operation is conducted to set forward one on the frame number K in Step S226 and the process proceeds to Step S230. However, if the UP switch has not been turned on, a judgment is made in Step S227 as to whether the DOWN switch 16 has been turned on or not. If the DOWN switch 16 has been turned on, an operation is conducted to set back one from the frame number K in Step S228 and then the process proceeds to Step S230. If not, however, the process proceeds to Step S231. In Step S230, the recording head is shifted to the position of the track in the recording medium in which the image signals corresponding to the frame K are stored. In Step S231, the frame number K is displayed on the display device 21.

In the next step Step S232, a judgment is made again as to whether the switch SW1 has been turned on for the second time. If the answer is NO, the process proceeds to Step S233 in which a predetermined frame feed time is set and then the process returns to Step S225.

If the judgment is Step S231 has proved that the switch SW1 has been pressed for the second time, the process proceeds to Step S240 in which the disk rotation motor is stopped to complete the control. The above-described operation is then repeated to conduct photographing and reproduction of images.

As will be understood from the foregoing description, in the first and second embodiments of invention, it is possible to effect the recording and reproduction, particularly the start and stop of the recording and reproduction, and they be conducted by the same operation members.

In the recording mode, the recording operation is started when the switch SW2 is turned on, whereas, in the reproduction mode, the reproduction is conducted after the switch SW1 is turned on till the same switch SW1 is turned on again. This remarkably facilitates the operation of the apparatus.

A description will be given hereinunder an apparatus of the type in which photographing conditions are input through an UP/DOWN operation means and which has a reproducing function in itself or externally for connection through an adapter so as to record and reproduce data in tracks of a recording medium by means of recording and reproducing heads. More specifically, the description will be given, with specific reference to FIG. 7, as to means for allowing selection between the photographing mode and the reproduction mode, as well as means for allowing a shift of the track position on the recording medium in response to the input through the UP/DOWN operation means when the reproduction mode has been selected by the first means. In FIG. 7, the same reference numerals are used to denote the same parts as those appearing in FIG. 1, and a detailed description of such parts is omitted.

Referring to FIG. 7, the apparatus embodying the present invention has circuits 112 and 113 which are adapted to operate in response to stroking of DOWN and UP switches such as to produce a one-shot pulse for each stroking of the switch. These circuits, therefore, will be referred to as a DOWN switch 112 and an UP switch 113, respectively.

Numerals 114, 115, 116 and 117 denote AND gates which are adapted to deliver outputs C of high level when both the inputs a and b take a high level.

UP/DOWN counters 118 and 119 are adapted for counting, respectively, the number of the frames and the shutter speed. Each of these counters is adapted for reducing its output by one upon receipt of a positive pulse to its terminal D and to increase its output by one upon receipt of a positive pulse to its terminal U.

A reference numeral 20 designates a head position driver 20 which is adapted to operate in accordance with the output of a frame number counter 10A in the process control circuit 10 during the photographing and in accordance with the output from the counter 118 during the reproduction, so as to change the position of the recording/reproduction head thereby effecting the frame feed, i.e., the track feed. A numeral 12 denotes a release switch by means of which photographing instruction for commencing the photographing is effected.

FIG. 8 is a flow chart showing an example of the control performed by the operation control circuit 10. A description will be given hereinunder with reference to this Figure.

(i) Photographing mode

The program is started as a power supply switch (not shown) is turned on in Step S100. In the photographing mode, the process control circuit 100 receives a signal indicative of the fact that the present mode is the photographing mode, through the operation of the mode changing switch 14, in Step S101.

In this state, the process control circuit 10 delivers a low-level signal and a high-level signal at its outputs 10B and 10D, thereby to block inputs from AND gates 114 and 115, while permitting signals to be input from the AND gates 116 and 117, in Step S102. In consequence, the shutter speed setting counter 119 is allowed to operate and the output of the counter 119 is increased and decreased by one, respectively, in response to each pressing operation of the UP switch 113 and the DOWN switch 112.

For instance, by setting the counter output in relation to the shutter speed in a manner shown in FIG. 9, it is possible to set the shutter speed by inputting the output of the counter 119 to the process control circuit 10 through the terminal 10E. The thus set shutter speed is read in Step S102.

In FIG. 6, the counter output is shown in terms of the Tv value (Time value) which is given as follows:

$$Tv = \log 2(1/\text{shutter speed})$$

In this state, the photometry circuit 9 is operative because the photometry switch 9a has been turned on as the power supply has been turned on in Step S100, so that the output (Ev value) representing the result of the photometry is input to the process control circuit 10 through the terminal 10d in Step S103.

The process control circuit 10 then computes, in accordance with the following formula, the stop condition necessary for effecting optimum exposure of the image pickup device (CCD) 4.

$$Av = Ev - Tv$$

where, Av is given by $Av = \log 2(FnO)^2$

Thereafter, as the release switch 12 is pressed in Step S104, the stop 2b and the shutter 3b are driven by the respective drivers 2a and 3b such as to give the stop value and the shutter speed determined as explained above. In consequence, the image pickup device 4 is exposed in Step S106, and the exposure output is processed by the record signal processing circuit 5 into recordable signals.

Meanwhile, the recording/reproducing circuit 6 has been set in the recording mode, in response to a signal derived from the terminal 10c of the process control circuit 10 so that the output from the record signal processing circuit 5 is written in the recording medium through the recording/reproduction head in Step S107.

After the completion of recording, an increment by one is effected in the frame number counter 10A of the process control circuit 10 and the count output therefrom is input to the recording/reproduction head position driver 20 thereby effecting the frame feed, i.e., the track feed, in Step S108.

(ii) Reproduction mode

The operation in the reproduction mode is as follows.

As the mode changing switch 14 is operated to the reproduction mode, a signal representing the reproduction mode is examined in Step S101 and the process proceeds to commence the operation in the reproduction mode.

In this state, the process control circuit 10 delivers a high-level signal and a low-level signal at its terminals 10B and 10D, thus allowing the signal input from the AND gates 114 and 115, while prohibiting the signal input from the AND gates 116 and 117, in Step S115.

As a result, the frame number counter 18 becomes operative. Then, whether the UP switch 113 or the DOWN switch 112 is pressed or not is judged in Step S110 or S112 and, in response to each pressing of one of these switches, the output of the counter 118 is increased or decreased by one, respectively, in Step S111 or S113.

Meanwhile, the output of the counter 118 is delivered to the process control circuit 10 through the terminal 10c, so that the head position driver 20 is activated in response to a signal from a terminal 10k, thereby driving the recording/reproduction head to a desired frame position, i.e., track position.

In this state, the recording/reproduction circuit 6 has been set in the reproduction mode in response to the output delivered through the terminal 10c of the process control circuit 6, so that it delivers the signals picked up through the recording/reproduction head to the reproduction signal processing circuit 7 after an amplification to a suitable level by, for example, a preamplifier.

In the reproduction signal processing circuit 7, the signal reproduced from the recording/reproduction circuit 6 is delivered through the output terminal 8 after processing to a suitable form of image signals such as NTSC or RGB.

In the foregoing description, the UP/DOWN switch is used only for the purpose of setting the shutter speed, for the purpose of simplification of explanation. This, however, is not exclusive and those skilled in the art will readily understand from the foregoing description that the same control is applied also to the setting of other factors such as the A/E mode, stop control, white balance control and so forth.

It will be also clear that the described embodiment can be applied to an image recording/reproducing apparatus for moving pictures having a reproduction facility with a function for still image reproduction function From the foregoing description, it will be understood that the present invention eliminates problems such as increase in the apparatus size, complication in the operation and a rise in the cost which may otherwise be caused due to an increase in the number of operation members. In addition, the appearance and maneuverability of the apparatus are improved by virtue of the reduction in the number of the operation members.

A description will be given with reference to FIGS. 10 to 15 as to an embodiment which is an image recording and reproducing apparatus with a display means in a view finder, wherein the display is stopped during reproduction so as to inform the user of the fact that the apparatus is in the reproducing mode, while saving the power and prolonging the life of the display elements.

FIG. 10 is a perspective view illustrating the appearance of an image recording apparatus of this embodiment. The apparatus has a body 121, a view finder 122 for allowing the user to aim at an object, and a lens 123. The apparatus also has an external display device 124 which is located, for example, on the top deck portion of the body 121, and constituted by display elements such as LCDs. A numeral 125 designates a release button which, when pressed by a user's finger, triggers the photographing operation.

The apparatus further has a mode changing switch 126 for switching the operation between the photographing mode and the reproduction mode, an exposure correction member 127, and a stroboscope interface 128. A numeral 129 denotes a change-over switch for the external display device 129.

Figure 11:
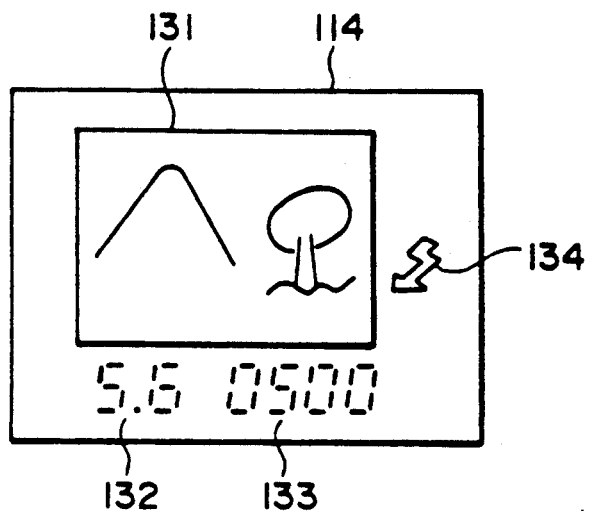
FIG. 11 is an illustration of an example of the display within a view finder of the apparatus shown in FIG. 10 when the apparatus is in the photographing mode.

FIG. 11 illustrates an example of the display which is given in the view finder so as to be seen by the user who looks into the view finder. The sight in the view finder includes a region 131 in which an image, of the object is formed, a region 132 for the stop value and composed of two digits each consisting of seven display segments, and one dot, a region 133 for displaying the inverse of the shutter time, i.e., the shutter speed, including four digits each consisting of seven display elements, and a region 134 where a mark indicating that a stroboscope has been connected to the stroboscope interface 128.

Figure 12:
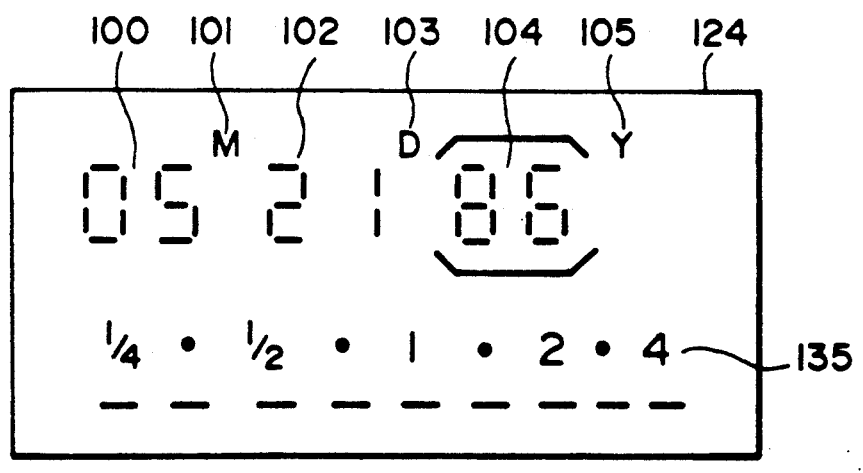
FIG. 12 is a diagrammatic view an example of a display of an external display unit which is set in the photographing mode.

FIG. 12 shows an example of the display on the external display device 124. The display on the external display includes display sections 100, 102 and 104 for indicating month, day and year, respectively, constituted by two digits each consisting of seven segments. Numerals 101, 103 and 105 are marks M, D and Y which represent, respectively, month, date and year. This arrangement is similar to that shown in FIG. 2 but the external display device 124 employed in this embodiment further includes a section 135 for displaying the multiplication factor for the exposure correction.

Figure 13:
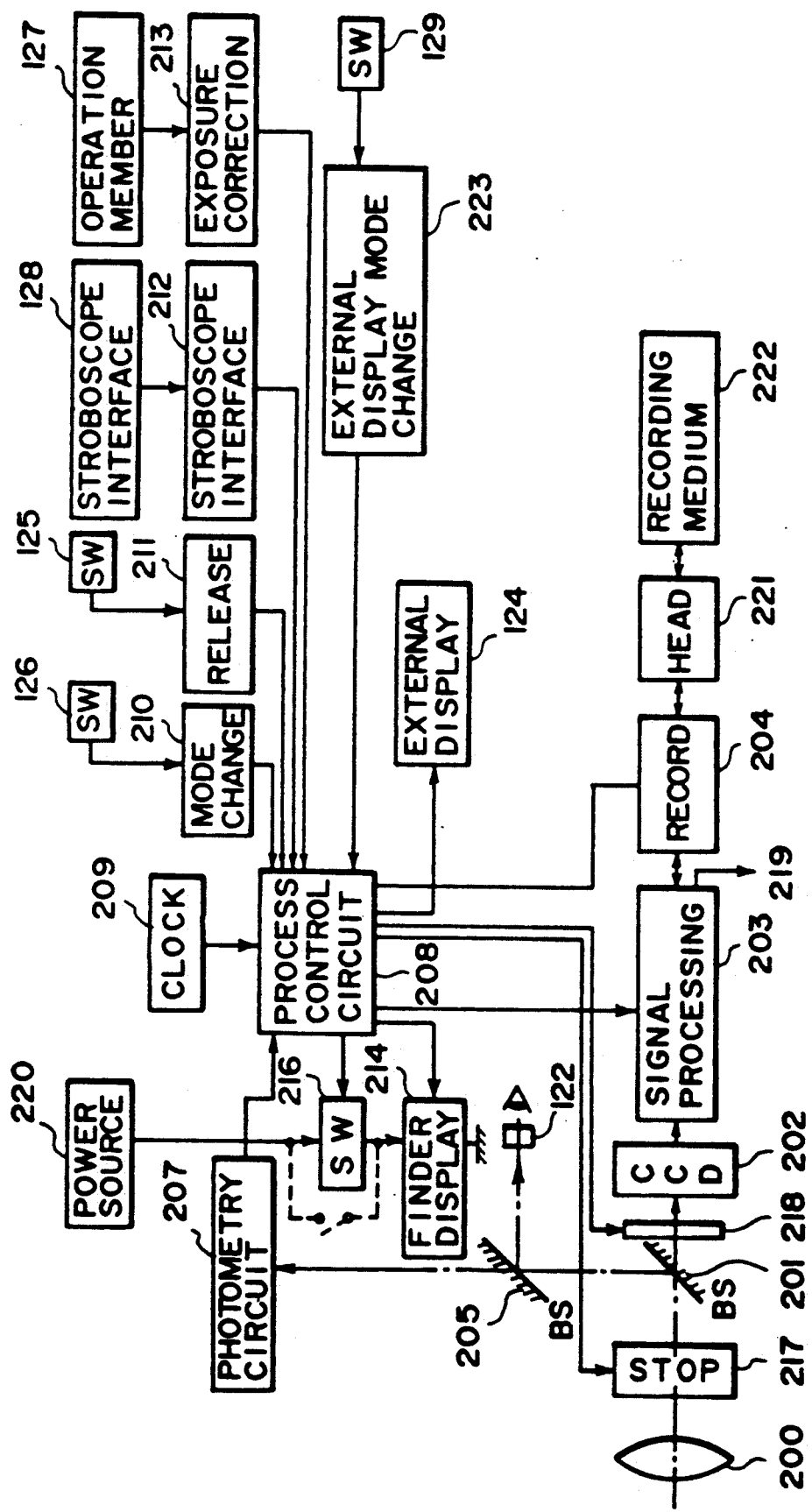
FIG. 13 is an electric circuit diagram of an electric circuit employed in the embodiment shown in FIG. 10.

FIG. 13 shows the electric circuit employed in the present embodiment. The apparatus has an image-forming optical system 200, beam splitters 201, 203, an image pickup device 202 such as CCD, and a signal processing circuit 203 corresponding to the circuits 5 and 7 shown in FIG. 1. A recording/reproduction circuit 204 corresponds to the portions of the recording/reproduction circuit 6 other than the head 6''' and the medium 6'. A numeral 209 represents a clock circuit for displaying the year, month and day. The apparatus further includes the following circuits.

A mode change circuit 210 is adapted for generating a mode changing input in response to the operation of the mode changing switch 126 shown in FIG. 10

A release circuit 211 is adapted for generating a release signal in response to the operation of the release button 125 shown in FIG. 10.

An interface circuit 212 is adapted for functioning as an interface, through the aid of the stroboscope interface 128 shown in FIG. 10, between the apparatus and an external stroboscope.

An exposure correction circuit 213 is adapted for generating an exposure correction multiplication factor in response to an input from the exposure correction operation member 127.

The display device in the view finder 122, having the display regions 132 to 134 as shown in FIG. 11, is denoted by a numeral 214.

A switch 216 is adapted for turning on and off the supply of power from a power supply 220 to the display device 214 in the view finder 214, in response to a display control signal from the process control circuit 208.

A stop 217 and a shutter 218 are disposed in the path of light between the optical system 200 and the CCD constituting the image pickup device 202.

A reference numeral 219 designates a reproduction signal output from the signal processing circuit 203.

A recording/reproduction head 221 is connected to the recording circuit 204 and is adapted to conduct recording and reproduction of the image signal in and from a recording medium 222.

An external display mode change circuit 223 is adapted for changing the mode of display on the external display device 124 in accordance with the output from the external display mode change switch 129.

The circuit explained hereinabove operates in a manner which will be explained hereinunder.

(i) Photographing mode

The explanation will be given first of the operation in the photographing mode. As the mode change switch 126 shown in FIG. 10 is turned to select the photographing mode, a part of the light coming from an object through the optical system 200 shown in FIG. 13 is introduced to the photometry circuit 207 through the beam splitters 201, 205, and the photometry output from the circuit 209 is input to the process control circuit 208. The process control circuit 208 then determines the shutter speed and the stop value in accordance with the photometry data and the input from the stroboscope interface circuit 222, and delivers signals for displaying the thus determined shutter speed and the stop value in the display sections 132 to 134 in the display device 214 within the view finder.

At the same time, the process control circuit 208 delivers a display control signal which acts to turn the switch 216 on thereby allowing the electric power to be supplied to the display device 214 from the power supply 220, thus enabling the user to see the display as shown, for example, in FIG. 11.

Meanwhile, the external display device 124 displays data as shown, for example, in FIG. 12, on the basis of the data given by the exposure correction circuit 213 and the clock circuit 209.

As the release button 125 is pressed in this state, the release signal from the release circuit 211 is delivered to the process control circuit 208 so that the latter controls the shutter 218 and the stop 217 in accordance with the computed shutter speed and the stop value, thereby allowing the image pickup device 202 to be exposed.

The exposure output from the image pickup device 202 is delivered to the signal processing circuit 203 so as to be processed suitably.

It will be understood that the signal processing circuit 203 and the recording circuit 204 have been switched for operation in the photographing mode, in response to the control signal given by the process control circuit 208.

The processed exposure output is then recorded in the recording medium 222 through the recording/reproduction head 221 by the operation of the recording circuit 204.

(ii) Reproduction mode

The operation in the reproduction mode is as follows.

In this case, the mode change switch 126 shown in FIG. 10 has been turned to select the reproduction mode so that the mode change circuit 210 delivers a signal to the process control circuit 208 for prohibiting input of all the signals from the photometry circuit 207, release circuit 211, stroboscope interface circuit 212 and the exposure correction circuit 213, while turning off the switch 216, so that the supply of power from the power supply 220 to the display device 214 within the view finder is stopped to suspend the display of data on the display device 214.

In addition, the external display device 124 is operated to display the fact that the apparatus is in the reproduction mode. For instance, as shown in FIG. 14, all the display sections 101, 103, 105 and 135 are put off, and a sign "PLAY" is displayed by using four digits (each consisting of seven segments) in the display sections 100 and 102, while showing the No. of the frame on display by making use of two digits each having seven segments in the display section 104 of the external display device of the external display device 124

Meanwhile, the signal processing circuit 203 and the signal recording circuit 204 are switched to the reproducing mode so that the recording circuit 204 operates to deliver to the signal processing circuit 203 the reproduction signal which is picked up by the head 221 from the recording medium 222 The signal processing circuit 203 then converts the reproduction signal into image signals of a suitable form such as NTSC or RGB and delivers the converted reproduction output signal 214

Thus, when the apparatus is used in the reproduction mode, no display of data, except for the image of the object, is seen in the view finder 122. This, however, does not cause any inconvenience because in this state the user is not intending to shoot an image Moreover, the elimination of data in the view finder 122 informs the user of the fact that the apparatus is now in the reproducing mode.

Figure 15:
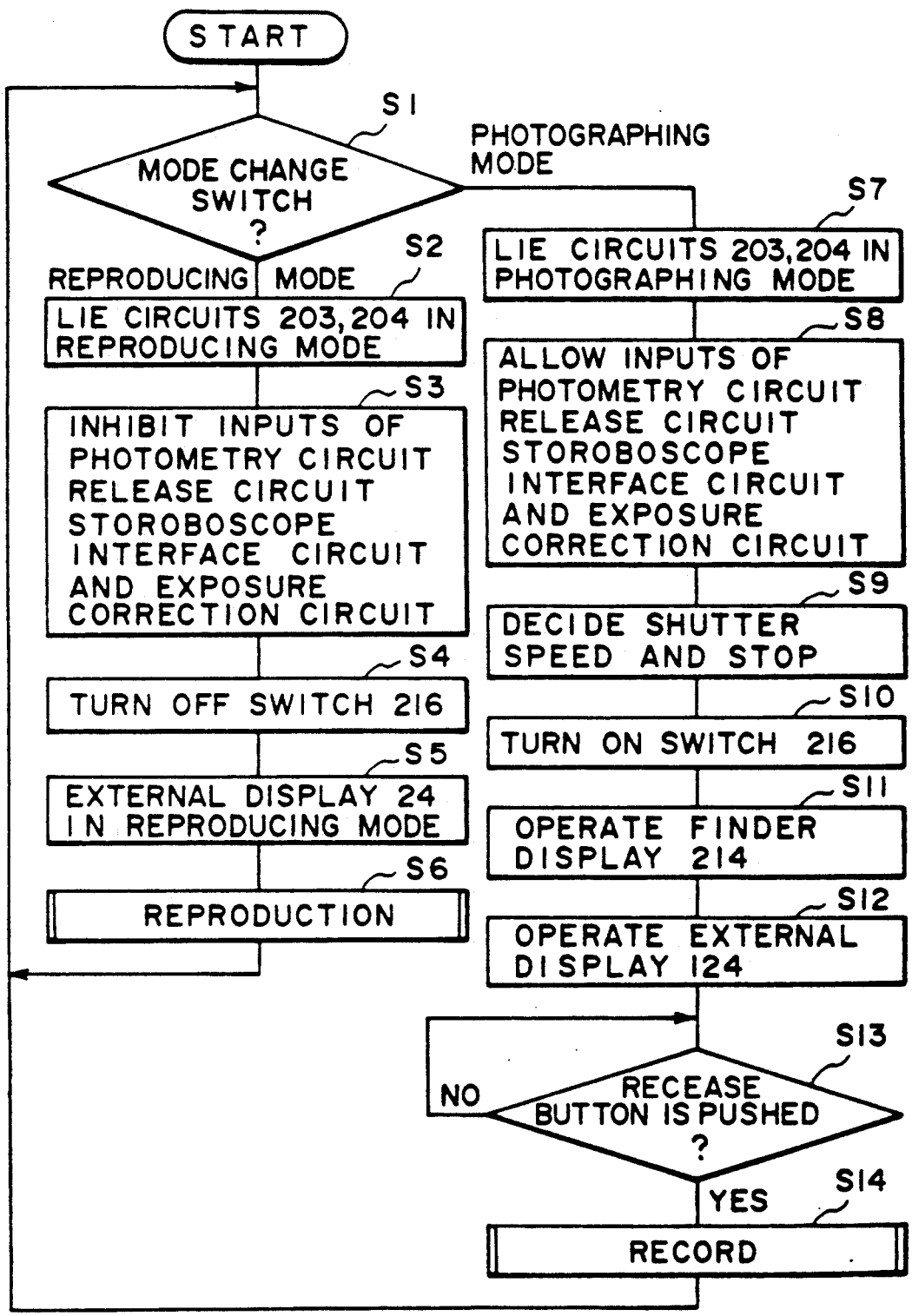
FIG. 15 is a flow chart illustrating an example of the flow of control performed by the embodiment shown in FIG. 10.

FIG. 15 shows an example of the process of control of the display performed by the process control circuit 208 both in the recording mode and the reproduction mode.

In Step S1, a judgment is made as to whether the mode change switch 126 has been set for the photographing mode or the reproduction mode. When the reproduction mode has been selected, the process proceeds to Step S2, whereas, when the photographing mode has been selected, the process proceeds to Step S7.

In the reproduction mode, in Step S2, the signal processing circuit 202 and the recording circuit 203 are changed to reproduction mode and, in Step S3, the input to the process control circuit 208 is inhibited for all the signals from the photometry circuit 207, release circuit 211, stroboscope interface circuit 212 and the exposure correction circuit 213.

In Step S3, the switch 216 is turned off so as to stop the supply of power to the display device 214 in the view finder from the power supply 220, thereby stopping the display in the view finder. In Step S4, the display on the external display device 124 is changed to the reproduction mode, thus allowing the display of the sign "PLAY" in FIG. 14 on the sections 100 and 102 of the display device 124. At the same time, the No. of the frame under reproduction is shown on the section 104 of the display device 124. Other sections 101, 103, 105 and 135 do not make any display.

Then, the process proceeds to a sub-routine S6 in which an ordinary reproduction is effected.

On the other hand, when the apparatus is in the photographing mode, the process proceeds to Step S7 in which the signal processing circuit 202 and the recording circuit 203 are switched for the operation in the photographing mode.

In this state, in Step S8, the photometry circuit 207 is allowed to operate, and the process control circuit 208 receives the inputs from the release circuit 211, stroboscope interface circuit 212 and the exposure correction circuit 213.

In Step S9, the shutter speed and the stop value are determined in accordance with the output from the photometry circuit 207.

In Step S10, the switch 216 is turned on, thus enabling the display device 214 in the view finder to operate. In consequence, in Step S11, input data is displayed on the display device 214 together with the image of the object, as shown in FIG. 11.

In Step S12, the external display device 124 conducts a display for the recording mode as shown in FIG. 3.

In Step S13, as soon as the pressing of the release button 125 is detected, the process proceeds to Step S14 in which a sub-routine is commenced for the signal processing operation for the recording of the signals.

As will be understood from the foregoing description, in this embodiment, the display of data is stopped when the apparatus is used in the reproducing mode, so as to inform the user of the fact that the apparatus is being used in the reproducing mode. In addition, the elimination of the data display during the operation in the reproducing mode contributes to an economical use of the electric power, as well as to a longer life of the display elements.

In regard to the saving of the electric power in particular, the arrangement may be such that the display in the view finder is suspended only when the power is being supplied from the battery: that is, the display is not stopped when the power is being supplied from an external power supply such as commercial A.C. source. This can be realized without difficulty by connecting, in parallel with the switch 216 shown in FIG. 13, a switch which is turned off when the power is being supplied from the battery and turned on when the power is being supplied from the commercial power supply.

Although the foregoing description is based on an assumption that the image is a still image and that the view finder is an ordinary optical type view finder, the described embodiment can be applied also to the processing of moving images and also to the case where the view finder is of an electronic type, as will be readily understood by those skilled in the art.

Figure 16:
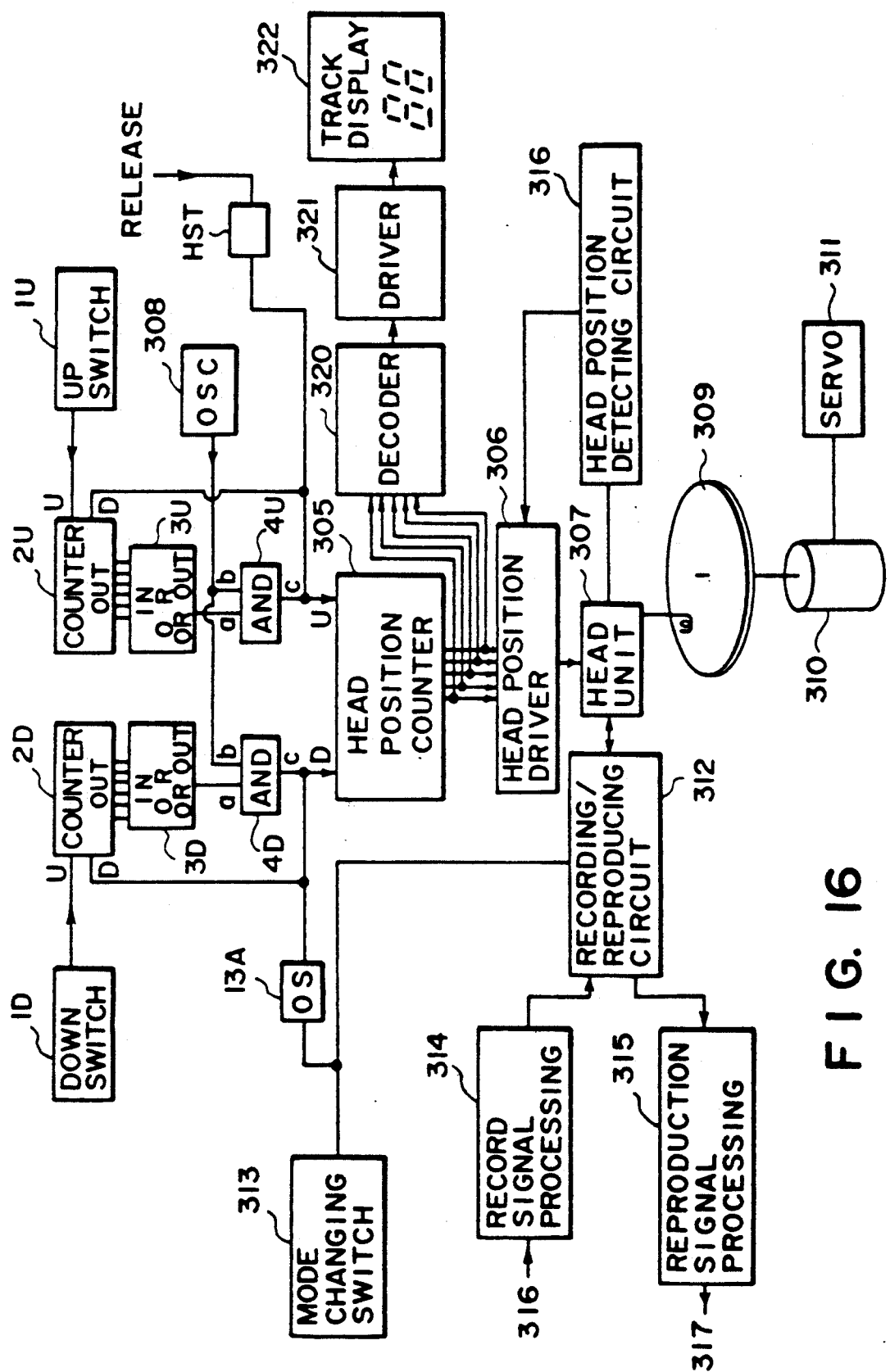
FIG. 16 is a block diagram of a fifth embodiment of the present invention.

A description will be to given hereinunder with specific reference to FIG. 16 as to an apparatus which also is an embodiment of the present invention and which has means for storing the number of strokings of the UP/DOWN switch so as to effect the track feed by the amount corresponding to the stored number.

Referring to FIG. 16, the apparatus has pulse generating circuits 301U and 301D having an UP switch and a DOWN switch and adapted for generating positive pulses each time the respective switches are pressed. These pulse generating circuits, therefore, will be referred to as "UP switch" and "DOWN switch", respectively, for the sake of convenience.

Numerals 302U, 302D and 305 denote counters each having an UP terminal U and a DOWN terminal D. Each of these counters produces a digital output OUT which is increased by "1" each time a positive pulse is received by the terminal U and decreased by "1" each time a positive pulse is received by the terminal D thereof. The counters 302U and 302D are adapted to count the number of strokings, i.e., the numbers pressing operations, of the UP switch 301U and the DOWN switch 301D. The counter 305 is adapted for storing data concerning the track position.

Numerals 3U and 3D represent, respectively, OR gates which receive the outputs OUT from the counters 2U and 2D, respectively. Therefore, the OR output OROUT delivers a signal of low level when the counter output is zero, whereas, when the counter output is not zero, the output OROUT takes high level.

AND gates 4U and 4D are adapted for receiving, at their input terminals a, the outputs from the OR gates 3U and 3D, respectively, as well as an oscillation output of a later-mentioned oscillator 308 at their input terminals b. Each of these AND gates produces an output c which takes high level only when both the inputs delivered to the inputs a and b are of high level, and low level when either one or both the inputs received at the terminals a and b are of low level.

A reference numeral 306 designates a head position driver for controlling the position of a head unit 307 in accordance with the output from the head position counter 305. The head position driver 306 receives data concerning the absolute track position from a head position detecting circuit 316 which makes use of a code plate (not shown) provided in the head unit 307. The head position driver 307 is adapted for driving the head until the output of the counter 305 becomes equal to the absolute track position.

The pulse oscillator 308 mentioned before is adapted to oscillate at a frequency which is of such a level as to enable the head unit 307 to conduct the track feed operation.

A recording medium 309 which may be a disk is adapted to be rotated by a motor 310 which operates under the phase and speed control performed by a servo circuit 311.

A reference numeral 312 designates a recording/reproducing circuit which operates in accordance with the state of the mode change switch 313. Namely, when the apparatus is in the recording mode, the circuit 312 operates to enable the head unit 307 to record in the recording medium 309 the output signal which has been delivered through the input terminal 316 and then processed by the record signal processing circuit 314. Conversely, during operation in the reproducing mode, the recording/reproducing circuit 312 operates to enable the head unit 307 to read signals from the recording medium 309 and to allow the reproduction signal processing circuit 315 to process and deliver the read signal through an output terminal 317. A reference numeral 313A represents a one-shot circuit which generates a single pulse when the operation mode is changed from the recording mode to the reproducing mode. The output from the one-shot circuit 13A is received by the terminal D of the counter 305.

The apparatus further includes a decoder 320 for decoding the counting output of the head position counter 305, a driver 321 for producing a driving output in response to the decoder output, and a track display device 322 which is adapted to be driven by the driver 321 so as to display the No. of the track under reproduction. Namely, the output OUT from the head position counter 305 is decoded by the decoder 320 for the purpose of display of the track No., and the thus decoded output activates the driver 321 which in turn drives the track display device 322 thereby displaying the No. of the decoded track. For instance, the track display device 322 may be constituted by two-digit LED or LCD display unit, each digit being composed of seven segments of display segments. A timer HST is adapted to produce a single pulse when a time T, which is long enough to ensure the completion of the image photographing sequence and the recording sequence, has elapsed after pressing of a release button (not shown) for triggering the photographing and recording operation.

The operation of this embodiment will be explained hereinunder. It is assumed here that the apparatus has been switched to the reproducing mode and the UP switch 310 has been pressed 10 times. Since the present mode is the reproducing mode, the recording circuit 312 has been switched for operation in this mode by the mode change switch 313. Thus, the signals picked up from the recording medium 309 from the head unit 307 are output from the terminal 317 through the reproduction signal processing circuit 315.

As the UP switch 310 is pressed 10 times, 10 pulses are delivered to the counter 2U so that the output OUT from the latter takes a value 10 (ten) which causes the output OROUT from the OR gate 3U to take the high level. In consequence, the AND gate 4U operates to pass the pulse input from the oscillator 308 to pass therethrough. Namely, the pulse from the oscillator 308 is delivered to the U terminal of the head position counter 305 through the AND gate 4U and also to the terminal D of the counter 2U. In consequence, the content of the counter 305 and the content of the counter 2U are increased and decreased by one, respectively, by the single pulse delivered from the oscillator 308.

Thus, when 10 pulses have been input through the switch 1U, the output from the counter 2U is reduced to zero, so that the output OROUT from the OR gate 3U also is changed to low level, thereby inhibiting the input of signal to the AND gate 4U.

In consequence, only 10 pulses are received by the U terminal of the counter 305, so that the head unit 307 is fed by an amount corresponding to 10 (ten) tracks.

It will be understood that the head shift operation is conducted without fail because the head driver 306 continues to drive the head unit 307 until the absolute track position of the head unit 307 becomes equal to the value output from the counter 305.

Similarly, when the DOWN switch 1D has been pressed ten times, 10 pulses are received by the counter 305 so that the head unit 307 is returned by an amount corresponding to 10 tracks.

At the same time, the decoder 320 operates to decode the count output "10" of the head position counter 305 into a form suitable for the display on the display device 322, thus allowing the display device 322 to display "10" which is the No. of the track now on display.

Thus, in this embodiment, the output of the head position counter 305 representing the No. of the track presently selected, i.e., tracked by the head, is displayed on the track display device 322 regardless of whether the present operation mode is the photographing mode or the reproducing mode. Thus, the No. displayed on the track display device during operation in the photographing mode represents the No. of the track in which the picture data obtained by the next photographing operation is to be recorded. Meanwhile, the timer HST produces a single pulse after a delay time T upon each receipt of the release signal, the time T being long enough to ensure the completion of one photographing and recording cycle, as explained before. The pulse from the timer HST serves to count up the content of the counter 305 by one, so that the track display device 322 displays the track No. which has been increased by "1" upon completion of each photographing and recording cycle.

The display on the track display device 322 in the reproducing mode represents the No. of the track which is now under reproduction, thus enabling the user to easily recognize the track No. from which the image is being reproduced. It is to be understood also that, in the described embodiment, the content of the head position counter 305 is reduced by "1" each time the operation is switched from the photographing mode to the reproducing mode, so that the head immediately after the switching of operation mode is disposed on the track which was tracked by the head immediately before the switching of the operation mode. Needless to say, the user can select other tracks for reproduction by suitably operating the UP and DOWN switches so as to appoint the desired track.

Although the embodiment has been described on an assumption that the UP or DOWN switch has been pressed 10 times, this is only illustrative and the described operation can be attained regardless of the number n of cycles of pressing of the respective switches.

It will also be clear to those skilled in the art that the described operation and functions are attainable without difficulty even when a combination of a computer and a software is used in place of the described hardware which includes the counters, gates and so forth.

The record signal processing circuit 314 and its input terminal 316 may be constructed as an electronic camera. It is possible even to construct the whole system shown in FIG. 1 as a single apparatus which has both the photographing (recording) and reproducing functions.

It is also to be noted that the data input means constituted by the UP and DOWN switches may be provided only for the recording or reproducing purpose or, alternatively, the input means may be used commonly both for the recording and reproducing purposes.

As will be understood from the foregoing description, the described embodiment of the recording/reproducing apparatus offers an advantage that the track feed of the head is effected without fail and without requiring confirmation of the track upon each operation of the track shifting operation member such as UP/DOWN buttons. Namely, the user is required only to press the UP/DOWN buttons by a number which is necessary for appointing the desired track.

In addition, the control employed in the described embodiment for storing the number of pressing cycles of operation members such as UP/DOWN buttons and driving the head carriage as the load can be applied for the purpose of controlling other types of loads than the head carriage.

What is claimed is:

1. A recording and reproducing apparatus comprising:
    recording and reproducing means for picking up and recording image signals on a recording medium and for reproducing signals from the recording medium;
    switching means for switching a mode of operation between a recording mode and a reproducing mode prior to an operation of said recording and reproducing means;
    operation means having at least one operational state, the one operational state giving (1) an instruction for commencing the recording when said switching means has been operated to select said recording mode, and (2) an instruction for commencing the reproducing operation when said switching means has been operated to select said reproducing mode, the apparatus being latched in the selected mode until the mode is changed; and
    a single operation member for activating said operation means to commence recording in accordance with a first operation of said single operation member and to commence reproducing in accordance with a second operation of said single operation member, said second operation being different from said first operation.

2. A recording and reproducing apparatus according to claim 1, further comprising data supply means for supplying said recording and reproducing means with data to be recorded on said recording medium, said data supply means being adapted to supply image data to said recording and reproducing means.

3. A recording and reproducing apparatus according to claim 2, wherein said data supply means includes means for converting the image of an object into image data through a photoelectric conversion process.

4. A recording and reproducing apparatus according to claim 1, wherein said switching means includes a manually operable switch.

5. A recording and reproducing apparatus comprising:
    recording and reproducing means for picking up and recording image signals on a recording medium and for reproducing signals from the recording medium;
    switching means for switching a mode of operation between a reproducing mode and a recording mode;
    operation means having a first operating condition and a second operating condition which succeeds the first operating condition, said operation means commencing the picking up and recording operation in response to the second operating condition when said switching means have been operated to select said recording mode, and said operation means commencing the reproducing operation in response to the first operating condition when said switching means have been operated to select said reproducing means, the apparatus being latched in the selected mode until the mode is changed; and
    a single operation member for activating said operation means to commence recording in accordance with a first operation of said single operation member and to commence reproducing in accordance with a second operation of said single operation member, said second operation being different from said first operation.

6. A recording and reproducing apparatus according to claim 5, further comprising data supply means for supplying said recording and reproducing means with data to be recorded on said recording medium, said data supply means being adapted to supply image data to said recording and reproducing means.

7. A recording and reproducing apparatus according to claim 6, wherein said data supply means includes means for converting the image of an object into image data through a photoelectric conversion process.

8. A recording and reproducing apparatus according to claim 5, wherein said switching means includes a manually operable switch.

9. A recording and reproducing apparatus according to claim 7, wherein said converting means convert the image of an object into the image data in response to the first operating condition of said operation means.

10. A recording and reproducing apparatus according to claim 5, wherein said recording medium is disc shaped.

11. A recording and reproducing apparatus comprising:
    recording and reproducing means for recording signals on a recording medium and for reproducing signals from the recording medium;
    switching means for switching a mode of operation between a recording mode and a reproducing mode prior to an operation of said recording and reproducing means; and operation means having at least one operational state, the one operational state giving (1) an instruction for commencing the recording operation when said switching means has been operated to select said recording mode, and (2) an instruction for commencing the reproducing operation when said switching means has been operated to select said reproducing mode, the apparatus being latched in the selected mode until the mode is changed; and a single first operation member for activating said operation means to commence recording or reproducing wherein said operation means includes;

a second single operation member which is switchable between a first state in which it has been operated and a second state in which it has not been operated;

detecting means for detecting whether said second single operation member is in said first state or said second state; and control means for inhibiting the recording operation of said recording and reproducing means when said second state has been detected by said detecting means during operation of said apparatus in said recording mode, said control means also being adapted for allowing said recording and reproducing means to conduct the reproducing operation during operation of said apparatus in said reproducing mode, even when said second state is being detected.

12. A recording and reproducing apparatus according to claim 11, wherein said control means is adapted for continuing, once the switching of said operation member from said second state to said first state is detected during operation in the reproducing mode, the reproduction of signals even though said operation member is switched again from said first state to said second state.

13. A recording and reproducing apparatus according to claim 11, further comprising data supply means for supplying said recording and reproducing means with data to be recorded on said recording medium, said data supply means being adapted to supply image data to said recording and reproducing means.

14. A recording and reproducing apparatus according to claim 13, wherein said data supply means includes means for converting the image of an object into image data through a photoelectric conversion process.

15. A recording and reproducing apparatus according to claim 11, wherein said operation means includes:

an operation member which is switchable between a first state in which it has been operated and a second state in which it has not been operated;

detecting means for detecting whether said operation member is in said first state or said second state; and control means for inhibiting the recording operation of said recording and reproducing means when said second state has been detected by said detecting means during operation of said apparatus in said recording mode, said control means also being adapted for allowing said recording and reproducing means to conduct the reproducing operation during operation of said apparatus in said reproducing mode, even when said second state is being detected.

* * * * *

UNITED STATES PATENT AND TRADEMARK OFFICE
CERTIFICATE OF CORRECTION

PATENT NO. : 5,221,965
DATED : June 22, 1993
INVENTOR(S) : TADASHI OKINO, ET AL.

It is certified that error appears in the above-identified patent and that said Letters Patent is hereby corrected as shown below:

IN THE DRAWINGS

SHEET 1, FIGURE 1

"RELASE" should read --RELEASE--.

SHEET 5, FIGURE 4

"RELASE" should read --RELEASE--.

SHEET 9, FIGURE 7

"CHANGEING" should read --CHANGING--.

SHEET 10, FIGURE 8

"HAED" should read --HEAD--.

SHEET 15, FIGURE 15

"STOROBOSCOPE" (both occurrences) should read --STROBOSCOPE--.
"RECEASE" should read --RELEASE--.

UNITED STATES PATENT AND TRADEMARK OFFICE
CERTIFICATE OF CORRECTION

PATENT NO. : 5,221,965                                          Page 2 of 5
DATED      : June 22, 1993
INVENTOR(S): TADASHI OKINO, ET AL.

It is certified that error appears in the above-identified patent and that said Letters Patent is hereby corrected as shown below:

[57] ABSTRACT

"an" (second occurrence) should be deleted.

[60] RELATED U.S. APPLICATION DATA

"Continuation of Ser. No. 381,301, May 8, 1991," should read --Continuation of Ser. No. 381,301, July 18, 1989,--.

COLUMN 1

Line 7, "May 8, 1991," should read --July 18, 1989,--.
    Line 14, "a" should read --an--.
    Line 19, "a" should read --an--.
    Line 29, "during" should read --during the--.
    Line 30, "the" (second occurrence) should be deleted.

COLUMN 2

Line 40, "a" should read --an--.
    Line 46, "a" should read --an--.
    Line 65, "a" should read --an--.
    Line 68, "a" should read --an--.

UNITED STATES PATENT AND TRADEMARK OFFICE
CERTIFICATE OF CORRECTION

PATENT NO. :   5,221,965

DATED      :   June 22, 1993

INVENTOR(S) :  TADASHI OKINO, ET AL.

It is certified that error appears in the above-identified patent and that said Letters Patent is hereby corrected as shown below:

COLUMN 3

Line 10, "a" should read --an--.
    Line 23, "a" (first occurrence) should read --an--.
    Line 25, "inputting" should read --inputting signals--.
    Line 26, "a" should read --an--.

COLUMN 4

Line 7, "view" should read --view of--.
    Line 27, "a" (second occurrence) should read --an--.
    Line 64, "effect" should read --effecting--.

COLUMN 5

Line 12, "40" should be deleted.
    Line 36, "S" should read --13--.

COLUMN 6

Line 15, "mode," should be deleted.

UNITED STATES PATENT AND TRADEMARK OFFICE
CERTIFICATE OF CORRECTION

| | | |
|---|---|---|
| PATENT NO. : | 5,221,965 | Page 4 of 5 |
| DATED : | June 22, 1993 | |
| INVENTOR(S) : | TADASHI OKINO, ET AL. | |

It is certified that error appears in the above-indentified patent and that said Letters Patent is hereby corrected as shown below:

COLUMN 8

Line 20, "the" (third occurrence) should be deleted.

COLUMN 9

Line 53, "step" (first occurrence) should read --step,--.
Line 66, "of" should read --of the--.
Line 67, "the" should be deleted.

COLUMN 10

Line 1, "be" should read --can be--.
Line 9, "hereinunder" should read --hereinunder as to--.

COLUMN 12

Line 33, "function" (second occurrence) should read --function.--

COLUMN 13

Line 1, "image," should read --image--.
Line 34, "FIG. 10" should read --FIG. 10.--.

UNITED STATES PATENT AND TRADEMARK OFFICE
CERTIFICATE OF CORRECTION

PATENT NO. : 5,221,965
DATED : June 22, 1993
INVENTOR(S) : TADASHI OKINO, ET AL.

It is certified that error appears in the above-indentified patent and that said Letters Patent is hereby corrected as shown below:

COLUMN 15

Line 2, "device 124" should read --device 124.--.
Line 8, "medium 222" should read --medium 222.--.
Line 11, "signal 214" should read --signal 214.--.
Line 16, "image" should read --image.--.

COLUMN 16

Line 34, "to" should be deleted.

COLUMN 17

Line 2, "level," should read --level--.
Line 3, "level" should read --level,--.

COLUMN 21

Line 14, "ducing" should read --ducing,--.

Signed and Sealed this

Fifth Day of April, 1994

BRUCE LEHMAN

Attest:

Attesting Officer            Commissioner of Patents and Trademarks